(12) United States Patent
Yang

(10) Patent No.: US 12,413,867 B2
(45) Date of Patent: Sep. 9, 2025

(54) PHOTOGRAPHING METHOD AND APPARATUS, ELECTRONIC DEVICE, AND STORAGE MEDIUM

(71) Applicant: VIVO MOBILE COMMUNICATION CO., LTD., Guangdong (CN)

(72) Inventor: Qihao Yang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 223 days.

(21) Appl. No.: 18/326,651

(22) Filed: May 31, 2023

(65) Prior Publication Data

US 2023/0308778 A1  Sep. 28, 2023

Related U.S. Application Data

(63) Continuation of application No. PCT/CN2021/132970, filed on Nov. 25, 2021.

(30) Foreign Application Priority Data

Dec. 2, 2020  (CN) .......................... 202011401393.9

(51) Int. Cl.
*H04N 23/959* (2023.01)
*G06F 3/04817* (2022.01)
(Continued)

(52) U.S. Cl.
CPC ....... *H04N 23/959* (2023.01); *G06F 3/04817* (2013.01); *G06T 5/50* (2013.01); *H04N 23/631* (2023.01); *G06T 2207/20221* (2013.01)

(58) Field of Classification Search
None
See application file for complete search history.

(56) References Cited

U.S. PATENT DOCUMENTS 10,091,411 B2 * 10/2018 Ha .................... H04N 23/675
11,120,528 B1 *  9/2021 Seely ...................... G06T 5/73
(Continued)

FOREIGN PATENT DOCUMENTS

CN    104156149 A    11/2014
CN    104333703 A     2/2015
(Continued)

OTHER PUBLICATIONS

English translation of CN-113497890-A, Ding, 2021 (Year: 2021).*
(Continued)

*Primary Examiner* — James M Hannett
(74) *Attorney, Agent, or Firm* — Price Heneveld LLP

(57) ABSTRACT

This application discloses a photographing method and apparatus, an electronic device, and a storage medium, and pertains to the field of imaging technologies. The method includes: receiving a first input from a user on a target control in a camera preview screen, where the target control includes a first region and the first region corresponds to N depth-of-field values; displaying M camera icons in a second region of the target control in response to the first input, where each camera icon corresponds to one depth-of-field range; and controlling M cameras to photograph images and outputting a target image, where the target image is obtained by compositing the images photographed by the M cameras.

18 Claims, 15 Drawing Sheets

(51) Int. Cl.
*G06T 5/50* (2006.01)
*H04N 23/63* (2023.01)

(56) References Cited

U.S. PATENT DOCUMENTS

| | | | |
|---|---|---|---|
| 2012/0329516 A1* | 12/2012 | Prentice | H04N 5/772 348/E5.045 |
| 2014/0267243 A1 | 9/2014 | Venkataraman et al. | |
| 2015/0358542 A1 | 12/2015 | Sato | |
| 2016/0028948 A1* | 1/2016 | Omori | H04N 23/958 348/239 |
| 2016/0065832 A1* | 3/2016 | Kim | H04N 13/128 348/207.11 |
| 2016/0127638 A1 | 5/2016 | Guo et al. | |
| 2016/0309141 A1* | 10/2016 | Pulli | G06T 5/50 |
| 2018/0088444 A1 | 3/2018 | Matsumoto et al. | |
| 2019/0208176 A1 | 7/2019 | Ding et al. | |
| 2020/0082599 A1* | 3/2020 | Manzari | G06T 7/50 |
| 2021/0287343 A1* | 9/2021 | Kaida | H04N 23/635 |
| 2022/0124241 A1* | 4/2022 | Manzari | H04N 23/69 |

FOREIGN PATENT DOCUMENTS

| | | | |
|---|---|---|---|
| CN | 104349063 A | 2/2015 | |
| CN | 105138261 A | 12/2015 | |
| CN | 106060386 A | 10/2016 | |
| CN | 107995429 A | 5/2018 | |
| CN | 108900763 A | 11/2018 | |
| CN | 109688321 A | 4/2019 | |
| CN | 110647277 A | 1/2020 | |
| CN | 111654629 A | 9/2020 | |
| CN | 111818263 A | 10/2020 | |
| CN | 111866370 A | 10/2020 | |
| CN | 112492212 A | 3/2021 | |
| CN | 113497890 A * | 10/2021 | H04N 23/45 |
| JP | 2015231220 A | 12/2015 | |
| JP | 2016134817 A | 7/2016 | |
| KR | 20150144543 A | 12/2015 | |
| WO | 2016203584 A1 | 12/2016 | |
| WO | 2017161902 A1 | 9/2017 | |

OTHER PUBLICATIONS

Chinese Office Action issued in corresponding application No. k202011401393.9, dated Oct. 9, 2021.
International Search Report issued in corresponding application No. PCT/CN2021/132970, dated Feb. 18, 2022.

* cited by examiner

PHOTOGRAPHING METHOD AND APPARATUS, ELECTRONIC DEVICE, AND STORAGE MEDIUM

CROSS-REFERENCE TO RELATED APPLICATIONS

This application is a continuation application of International Application No. PCT/CN2021/132970 filed on Nov. 25, 2021, which claims priority to Chinese Patent Application No. 202011401393.9, filed on Dec. 2, 2020 and entitled "PHOTOGRAPHING METHOD AND APPARATUS, ELECTRONIC DEVICE, AND STORAGE MEDIUM", which is incorporated herein by reference in its entirety.

TECHNICAL FIELD

This application pertains to the field of imaging technologies, and specifically relates to a photographing method and apparatus, an electronic device, and a storage medium.

BACKGROUND

Currently, mobile phones are all provided with a plurality of cameras with different focal lengths, and a user may switch the cameras during preparation of photographing according to actual needs of the user. A mainstream solution nowadays is to add a select button in a camera application, so as to tap the button to pop up a window and then select one camera in the window.

During implementation of this application, the inventors have found at least the following problem in the prior art: the user can select only one camera, for example, selecting one of ultra-wide-angle camera, macro-distance camera, and the like on a mobile phone for photographing. This results in a single photographing mode and poor effects of photographed images, and actual use requirements of different users cannot be satisfied.

SUMMARY

This application is intended to provide a photographing method and apparatus, an electronic device, and a storage medium.

According to a first aspect, this application provides a photographing method, where the method includes:

receiving a first input from a user on a target control in a camera preview screen, where the target control includes a first region, the first region corresponds to N depth-of-field values, and N is a positive integer greater than 1;

displaying M camera icons in a second region of the target control in response to the first input, where M is a positive integer greater than 1, each camera icon corresponds to one depth-of-field range, and each depth-of-field range is determined based on a depth-of-field value corresponding to a target position of each camera icon in the second region; and controlling M cameras to photograph images and outputting a target image, where the target image is obtained by compositing the images photographed by the M cameras; and the M cameras are cameras associated with the M camera icons.

According to a second aspect, this application provides a photographing apparatus, including:

a first receiving module, configured to receive a first input from a user on a target control in a camera preview screen, where the target control includes a first region, the first region corresponds to N depth-of-field values, and N is a positive integer greater than 1;

a first responding module, configured to display M camera icons in a second region of the target control in response to the first input, where M is a positive integer greater than 1, each camera icon corresponds to one depth-of-field range, and each depth-of-field range is determined based on a depth-of-field value corresponding to a target position of each camera icon in the second region; and a first control module, configured to control M cameras to photograph images, and output a target image, where the target image is obtained by compositing the images photographed by the M cameras, and the M cameras are cameras associated with the M camera icons.

According to a third aspect, this application provides an electronic device, where the electronic device includes a processor, a memory, and a program or instructions stored in the memory and capable of running on the processor, and when the program or the instructions are executed by the processor, the steps of the photographing method according to any one implementation of the first aspect are implemented.

According to a fourth aspect, this application provides a readable storage medium, where a program or instructions are stored in the readable storage medium, and when the program or the instructions are executed by a processor, the steps of the photographing method according to any one implementation of the first aspect are implemented.

According to a fifth aspect, this application provides a chip, where the chip includes a processor and a communications interface, the communications interface is coupled to the processor, and the processor is configured to run a program or instructions to implement the steps of the photographing method according to any one implementation of the first aspect.

According to a sixth aspect, an embodiment of this application provides an electronic device configured to perform the steps of the photographing method according to the first aspect.

According to a seventh aspect, an embodiment of this application provides a computer program product, where the program product can be executed by the processor to implement the steps of the photographing method according to the first aspect.

According to the photographing method and apparatus, the electronic device, and the storage medium provided by this application, the target control is provided on the camera preview screen, so that the user makes setting for the target control to implement quick and accurate setting for switching of a plurality of cameras. In this way, clear images with different depths of field correspondingly photographed by different cameras are composited to output the target image, and all objects in the obtained target image have clear images.

DETAILED DESCRIPTION OF EMBODIMENTS

The following clearly and completely describes the technical solutions in this application with reference to the accompanying drawings in this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

The following describes in detail a photographing method provided in this application by using specific embodiments and application scenarios thereof with reference to the accompanying drawings.

It should be noted that, for the photographing method provided in the embodiments of this application, the execution entity may be a photographing apparatus, or a control module for executing the photographing method in the photographing apparatus. In this application, the photographing method being executed by the photographing apparatus is used as an example to illustrate the photographing method provided in this embodiment of this application.

Figure 1:
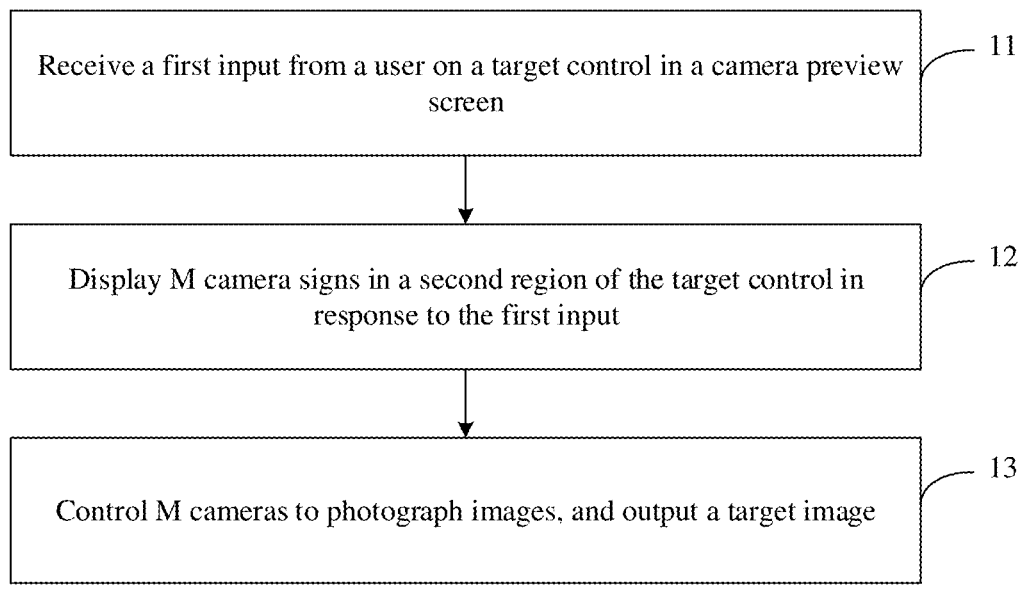
FIG. 1 is a schematic flowchart of a photographing method according to this application.

FIG. 1 is a schematic flowchart of a photographing method according to this application. As shown in FIG. 1, the photographing method provided in this application can be applied to a scenario in which a plurality of cameras are provided on a terminal, and a user invokes and sets some of the cameras according to photographing needs, so as to implement the purpose of multi-camera fusion photography. The photographing method may include the following steps 11 to 13.

Step 11: Receive a first input from a user on a target control in a camera preview screen.

The target control includes a first region, the first region corresponds to N depth-of-field values, and N is a positive integer greater than 1.

Specifically, the user may tap a camera icon on a terminal display to enter the camera preview screen and display one target control directly on the camera preview screen. The icon in this application is used to indicate information using text, symbol, image, or the like, and may use a control or other containers as a carrier for displaying information, including but not limited to a text icon, a symbol icon, and an image icon. The camera icon may be an icon located on the terminal screen, for example, a camera image or a camera symbol. The target control is a multi-camera operation screen, and the user may perform an operation or input on the target control to preset operating parameters for each camera of the terminal and switching between the cameras.

The target control may be displayed at the bottom of the terminal display for convenient operation using two hands by the user; or may be provided on the left or right side of the terminal display for convenient operation using one hand by the user. A window shape of the target control may be rectangular, circular, or other shapes.

Optionally, a specific region for displaying the target control on the terminal display may be set by the user based on use habits of the user. For example, in a case that the target control is displayed on the left side of the terminal display, the user may touch a predetermined region of the target control with his finger and drag to a region at the bottom of the display.

Optionally, after the user taps the camera icon on the terminal display and enters the camera preview screen, the target control may alternatively not be pre-displayed on the camera preview screen, but requires the user to press a shortcut button (for example, volume button+home button) or tap a preset icon on the camera preview screen for waking up, so as to bring up the target control on the camera preview screen.

This application does not specifically limit a start mode, window shape, display position, and the like of the target control.

Figure 2:
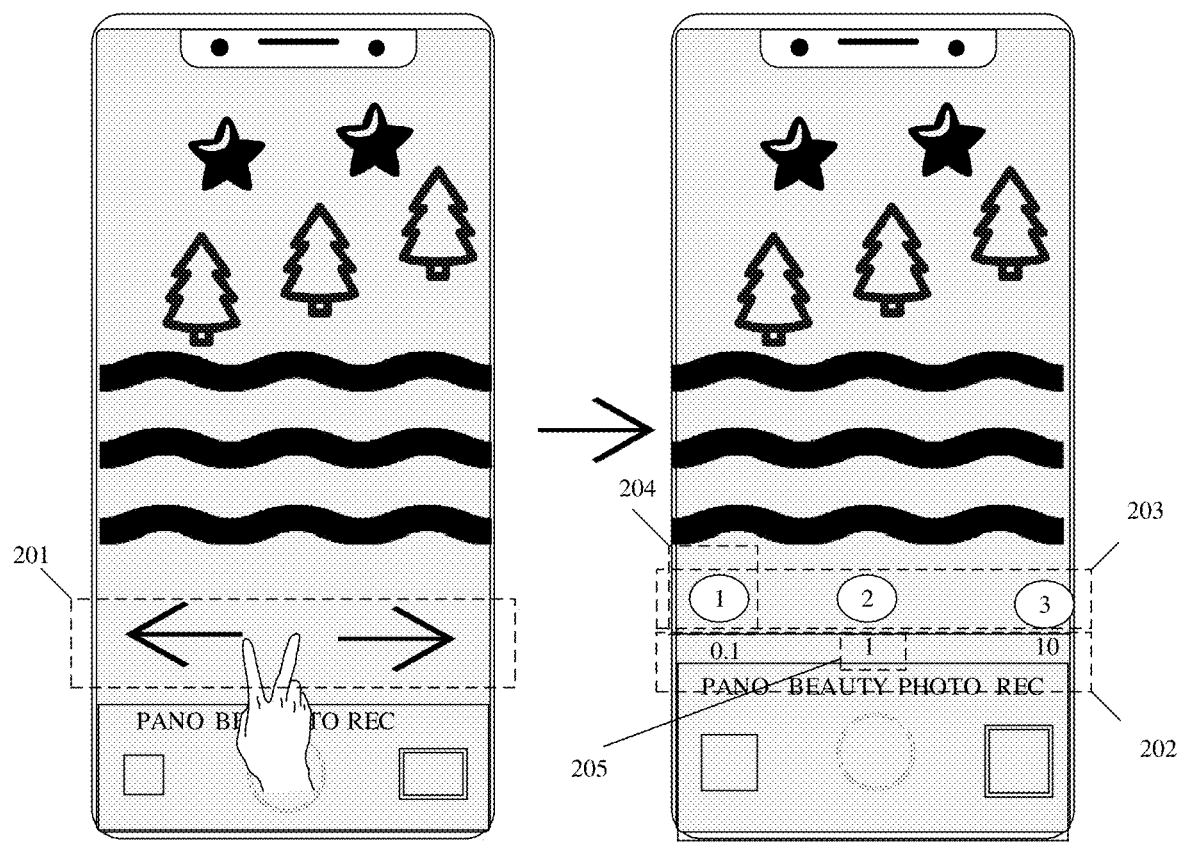
FIG. 2 is a first schematic diagram of a screen for a procedure of setting a target control according to this application.

FIG. 2 is a first schematic diagram of a screen for a procedure of setting a target control according to this application. As shown in FIG. 2, the application provides an operation method for invoking the target control on a camera preview screen by a user, mainly including: the user slides two fingers to two sides of the screen for a distance on the camera preview screen to bring up the target control.

Optionally, in order to prevent misoperation, it may be specified that at a preset position, for example, within the region 201 shown in the left figure in FIG. 2, the user can bring up the target control only by pressing the terminal display with two fingers and simultaneously sliding to two sides of the screen for a distance. If it is outside the region 201, the target control cannot be brought up even if the foregoing same operation is performed.

Optionally, to prevent user misoperation, it may be further specified that the target control can be brought up only when the distance of sliding two fingers to two sides of the screen is greater than a predetermined distance.

Further, as shown in the right figure in FIG. 2, this application provides a specific structure of the target control, mainly including a first region 202 and a second region 203. The first region 202 corresponds to a plurality of depth-of-field value identifiers 205, and each depth-of-field value identifier 205 corresponds to one depth-of-field value. Optionally, the first region 202 may be displayed on the terminal display in a form of a progress bar, and each point of the progress bar corresponds to a different depth-of-field value, for example, in a case that the progress bar is a horizontal progress bar, a total length of the progress bar may be determined based on a width of the terminal display.

Optionally, if the total length of the progress bar is 8 cm, a depth-of-field value corresponding to a point 0.1 cm away from a starting point of the progress bar (generally, the starting point is set near a left border of the terminal screen) may be set to 0.1, a depth-of-field value corresponding to a point 1 cm away is set to 1, and a depth-of-field value corresponding to a point 2 cm away is set to 2. Correspondingly, the depth-of-field value of each point on the progress bar may be pre-calibrated according to the foregoing proportional relationship between depth-of-field values and the length of the progress bar.

Optionally, a depth-of-field value may be directly displayed as a depth-of-field value identifier in the first region 202. For example, a depth-of-field value 0.1, a depth-of-field value 1, and a depth-of-field value 10 in the right figure in FIG. 2 each serve as a corresponding depth-of-field value identifier.

The foregoing plurality of depth-of-field values divide the photographing depth-of-field range into a plurality of consecutive depth-of-field ranges. For example, the depth-of-field value 0.1, depth-of-field value 1, and depth-of-field value 10 divide the whole photographing depth-of-field range into a depth-of-field range with 0.1-1× focal length, the depth-of-field range with 1-10× focal length and the depth-of-field range with focal length greater than 10×.

Optionally, all the depth-of-field values are distributed in the first region 202 from left to right in ascending order.

Corresponding to an arrangement order of the depth-of-field values, a plurality of camera icons 204 are correspondingly present within the second region 203. Each camera icon 204 is associated with one camera of the terminal.

Specifically, as shown in FIG. 2, the depth-of-field value 0.1 corresponds to a camera icon with a display number 1, the depth-of-field value 1 corresponds to a camera icon with a display number 2, and the depth-of-field value 10 corresponds to a camera icon with a display number 3. The camera icon with the display number 1, the camera icon with the display number 2, and the camera icon with the display number 3 are associated with three different cameras of the terminal, denoted as camera a, camera b, and camera c, respectively. During actual photographing, the camera a is used for photographing in the depth-of-field range with 0.1-1× focal length, the camera b is used for photographing in the depth-of-field range with 1-10× focal length, and the camera c is used for photographing in the depth-of-field range with focal length greater than 10×.

Step 12: Display M camera icons in the second region of the target control in response to the first input.

Each camera icon corresponds to one depth-of-field range, and each depth-of-field range is determined based on a depth-of-field value corresponding to a target position of each camera icon in the second region, M being a positive integer greater than 1. Corresponding to a case that the first region 202 is represented by a progress bar, the second region may be a region of a predetermined range corresponding to the progress bar, for example, a rectangular region located above or below the progress bar may be specified as the second region 203.

Specifically, after the target control is displayed on the camera preview screen, the user may operate the camera icon on the operation screen of the target control by performing the first input on the target control, such as tapping, dragging, pressing, or sliding.

Optionally, after receiving the first input, the terminal identifies the first input to implement operation on camera icons of the target control and corresponding depth-of-field ranges, and displays, on the camera preview screen, the target control operated by the user. Because the camera icons correspond to different cameras on the terminal, the operations such as switching and setting for each camera corresponding to the camera icon can be implemented by performing the operation on the camera icon.

For example, as shown in the right figure in FIG. 2, in a case that the first input of the user is an input for triggering the camera icon with the display number 1 on the target control, the camera icon 204 with the display number 1 on the target control is deleted and a camera icon with a display number 4 is added to a position of the camera icon with the display number 1. With the foregoing setting operation, a photographing depth-of-field range for a camera corresponding to the original camera icon with the display number 1 is changed to a photographing depth-of-field range for a camera corresponding to the camera icon with the display number 4.

In the photographing method provided in this application, the user may set a camera icon in the second region or set a depth-of-field range in the first region, so as to control switching of a plurality of cameras and set a photographing depth-of-field range for each camera, thereby implementing customized interaction for multi-camera photography and improving convenience of user operations.

Step 13: Control M cameras to photograph images, and output a target image.

The target image is obtained by compositing the images photographed by the M cameras, and the M cameras are cameras associated with the M camera icons.

Optionally, in a case that the second input is received from the user, for example, the user taps a photographing button on the camera preview screen or presses a preset photography shortcut button on the terminal, the cameras associated with the camera icons on the target control are controlled to perform photographing in related depth-of-field ranges respectively, and each camera photograph one frame of image.

For example, as shown in the right figure in FIG. 2, in a case that the second region includes three camera icons with display numbers 1 to 3, the camera icon with the display number 1 having a depth-of-field value of 0.1, the camera icon with the display number 2 having a depth-of-field value of 1, and the camera icon with the display number 3 having a depth-of-field value of 10, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-10× focal length, and a photographing depth-of-field range of the camera corresponding to the camera icon with the display number 3 is a depth-of-field range with focal length greater than 10×.

In a case that the target control is set as shown in the right figure in FIG. 2, the system receives the second input from the user and controls the three camera icons with display numbers 1 to 3 to photograph an image with the depth-of-field range of 0.1-1× focal length, an image with the depth-of-field range of 1-10× focal length, and an image with the depth-of-field range of focal length greater than 10×, respectively, and finally the three frames of images of the depth-of-field ranges are composited to output the target image.

Optionally, other manners may alternatively be used to control the cameras associated with the camera icons on the target control to perform photographing in related depth-of-field ranges respectively, for example, using time-lapse photography, timed photography, or automatic photography in response to sensed light change, which is not specifically limited in this application.

Finally, the images photographed by all cameras are composited to output the target image.

According to the photographing method provided by this application, the target control is provided on the camera preview screen, so that the user makes setting for the target control to implement quick and accurate setting for switching of a plurality of cameras. In this way, clear images with different depths of field correspondingly photographed by different cameras are composited to output the target image, and all objects in the obtained target image have clear images. This effectively improves convenience of performing multi-camera photographing operation by the user and effectively improves the imaging quality.

Based on content of the foregoing embodiments, as an optional embodiment, the controlling M cameras to photograph images and outputting a target image includes:

controlling each of the cameras associated with the M camera icons to photograph one frame of depth-of-field image, so as to obtain M frames of depth-of-field images; and composite the M frames of depth-of-field images to output the target image.

A difference between the photographing method provided in this application and the multi-camera photographing method commonly used in the prior art is mainly as follows:

In the prior art, in a case that a plurality of cameras are present on the terminal, the user usually switches, during photographing preparation, cameras according to actual needs of the user to select one of the cameras for photographing, or selects one of the plurality of cameras as a primary camera and all other cameras as secondary cameras for joint photographing.

However, in the technical solution of this application, on the one hand, the user may select, using the target control, some of the cameras for image photographing while keeping unselected cameras not started, thereby satisfying photographing requirements of different users and reducing power consumption of the terminal effectively. On the other hand, in the photographing method provided by this application, a depth-of-field range for each selected camera can be set by using the target control, and the cameras are not divided into primary and secondary ones, so as to fully use each camera to perform photographing in a matching depth-of-field range. As compared to the prior art in which one single camera is used for photographing all depth-of-field ranges, this can effectively improve the imaging quality and meet photographing needs of different users for selecting a specific camera to perform photographing in a specific depth-of-field range.

Specifically, in the photographing method provided by this application, a camera associated with each camera icon is used for photographing in a different depth-of-field range to obtain one image with a corresponding depth-of-field range. Because the first region of the target control corresponds to an entire depth-of-field range, at least one camera is associated with each depth-of-field range for photographing. A complete target image can be obtained by compositing images that are obtained by cameras corresponding to all depth-of-field ranges.

For example, in a case that the target control being set is shown in the right figure in FIG. 2, the camera icon with the display number 1, the camera icon with the display number 2, and the camera icon with the display number 3 are associated with three different cameras of the terminal, denoted as camera a, camera b, and camera c, respectively. During actual photographing, the camera a is controlled to perform photographing in the depth-of-field range with 0.1-1× focal length to obtain a first frame of image, the camera b is controlled to perform photographing in the depth-of-field range with 1-10× focal length to obtain a second frame of image, and the camera c is controlled to perform photographing in the depth-of-field range with focal length greater than 10× to obtain a third frame of image. Finally, the three frames are composited to output the target image.

Assuming that the first frame of image is an image containing a river in FIG. 2, the second frame of image is an image containing woods in FIG. 2, and the third frame of image is an image containing starry sky in FIG. 2. The foregoing image compositing method includes: splicing the images of the three different depth-of-field ranges, fusing overlapping portions, and outputting the target image.

In the photographing method provided by this application, a plurality of cameras on the terminal may be selected simultaneously by using the target control, and a photographing depth of field for each camera can be set, thereby satisfying photographing needs of different users and also providing a convenient and accurate multi-camera switching method. Specifically, this helps the user add new operation modes, so that the user may perform an interactive operation in a preview window to implement camera switching and photographing in some special scenarios. In addition, scenes within a respective depth-of-field range may be photographed by using a camera corresponding to each camera icon, so as to photograph and composite clear images of different depths of field to output the target image. This effectively improves convenience of multi-camera operation of the user and effectively improves the imaging quality.

Based on content of the foregoing embodiment, as an optional embodiment, the first input includes a first sub-input, and the first sub-input is an input from the user on K target positions of the target control. T camera icons are included on the target control before the first sub-input is received.

The displaying M camera icons in a second region of the target control in response to the first input may include:

in response to the first sub-input, adding K camera icons to K target positions in the second region; and updating depth-of-field ranges corresponding to the K camera icons and T camera icons based on the K target positions; where a start depth-of-field value of the i-th depth-of-field range corresponding to the i-th camera icon in the updated K camera icons is a depth-of-field value corresponding to a target position at which the i-th camera icon is located; in a case that the i-th camera icon has adjacent camera icons on both sides, an end depth-of-field value of the i-th depth-of-field range is a depth-of-field value corresponding to a target position in which the (i+1)-th camera icon in a depth-of-field value increasing direction is located; and in a case that the i-th camera icon has no adjacent camera icon in the depth-of-field value increasing direction, the end depth-of-field value of the i-th depth-of-field range is infinite; where the i-th camera icon is any one of the K camera icons, the M cameras include the K cameras and the T cameras, and M=K+T.

In the photographing method provided by this application, the first input is performed on the target control to add at least one camera icon in the second region of the target control. Correspondingly, within the first region of the target control, a depth-of-field value is added to a target position corresponding to the added camera icon, and each camera icon added is associated with one of other cameras of the terminal.

Figure 3:
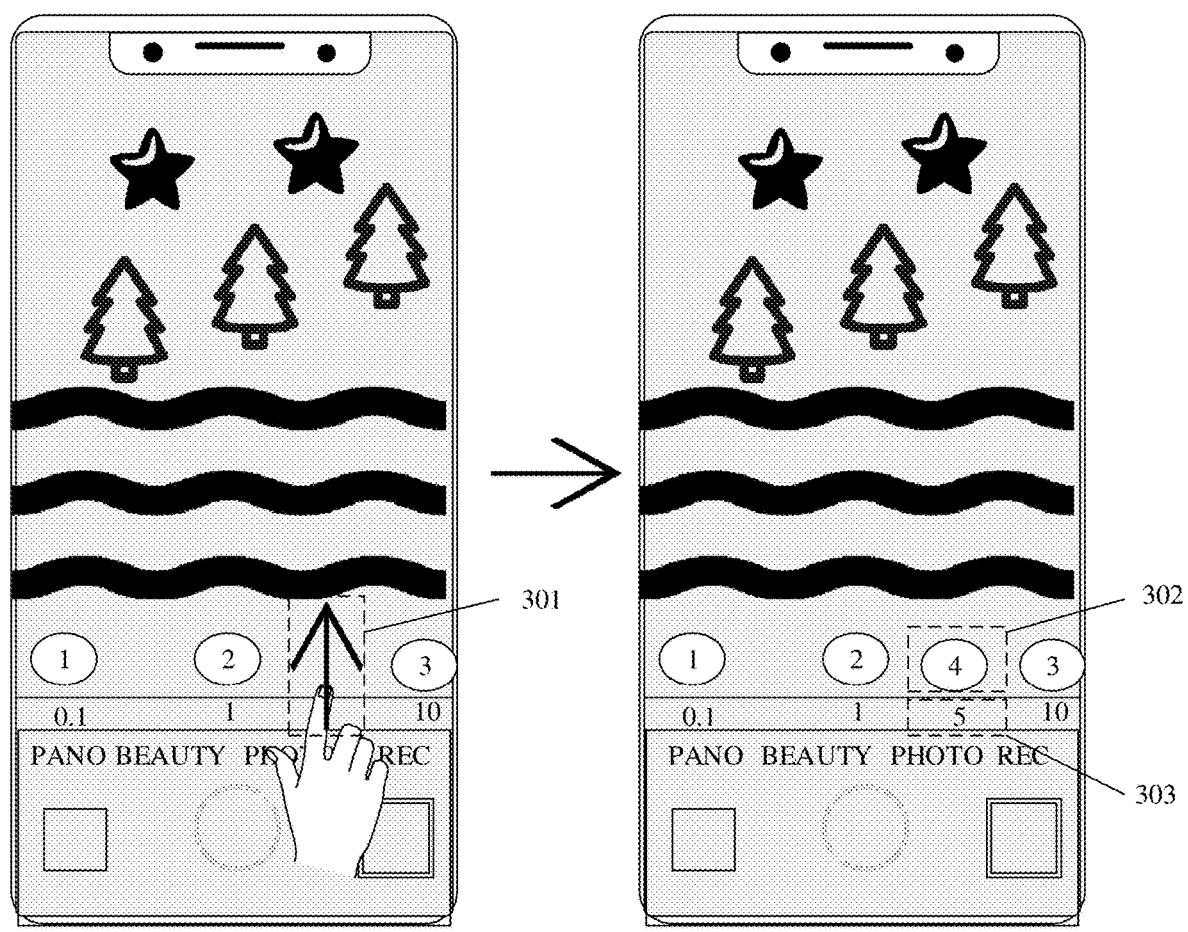
FIG. 3 is a second schematic diagram of a screen for a procedure of setting a target control according to this application.

For example, FIG. 3 is a second schematic diagram of a screen for a procedure of setting a target control according to this application. As shown in FIG. 3, in a case that K=1 and T=3, that is, in a case that three camera icons (which are three camera icons with display numbers 1, 2, and 3) are included in the target control before the first sub-input is received, one camera icon is added to the second region, which is specifically as follows:

As shown in the left figure in FIG. 3, in a case that the target control displayed on the current screen is a progress bar, the terminal invokes a total of three cameras (denoted as cameras a, b, and c) respectively associated with three camera icons with display numbers 1 to 3 in the second region. The camera icon with the display number 1 corresponds to a depth-of-field value of 0.1, the camera icon with the display number 2 corresponds to a depth-of-field value of 1, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-10× focal length, and a photographing depth-of-field range of the camera corresponding to the camera icon with the display number 3 is a depth-of-field range with focal length greater than 10×.

In a case that the first sub-input is pressing a target position 301 in the first region with a finger by the user and then sliding the finger to the second region for a predetermined distance, one camera icon is added to a position corresponding to the target position 301 in the second region. Optionally, the added camera icon is numbered through incrementing based on numbers of the original camera icons, that is, a display number of the newly added camera icon is 4. To be specific, a camera icon with the display number 4 is added to a region 302 in the right figure in FIG. 3. Based on the foregoing operations for invoking three cameras of the terminal, a camera (denoted as a camera d) associated with the camera icon with the display number 4 is additionally invoked.

Corresponding to the added camera icon 302, a new depth-of-field value 303 is added to the first region, where the depth-of-field value 303 corresponds to the target position. For example, the target position in FIG. 3 corresponds to a depth-of-field value 303 of 5 in the first region.

Correspondingly, because the newly added camera icon with the display number 4 is located between the camera icon with the display number 2 and the camera icon with the display number 3 and its corresponding depth-of-field value is set to 5, the depth-of-field range with 1-10× focal length corresponding to the original camera number 2 is divided into a depth-of-field range with 1-5× focal length and a depth-of-field range with 5-10× focal length that are adjacent.

The first sub-input is performed to set the target control. The second region includes four camera icons with display numbers 1 to 4. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, and the camera icon with the display number 3 corresponds to a depth-of-field value of 10. In this case, a photographing depth-of-field range of the camera a corresponding to the camera icon with the display number 1 is a depth-of-field range with 0.1-1× focal length, a photographing depth-of-field range of the camera b corresponding to the camera icon with the display number 2 is a depth-of-field range with 1-5× focal length, a photographing depth-of-field range of the camera d corresponding to the camera icon with the display number 4 is a depth-of-field range with 5-10× focal length, and a photographing depth-of-field range of the camera c corresponding to the camera icon with the display number 3 is a depth-of-field range with focal length greater than 10×.

Figure 4:
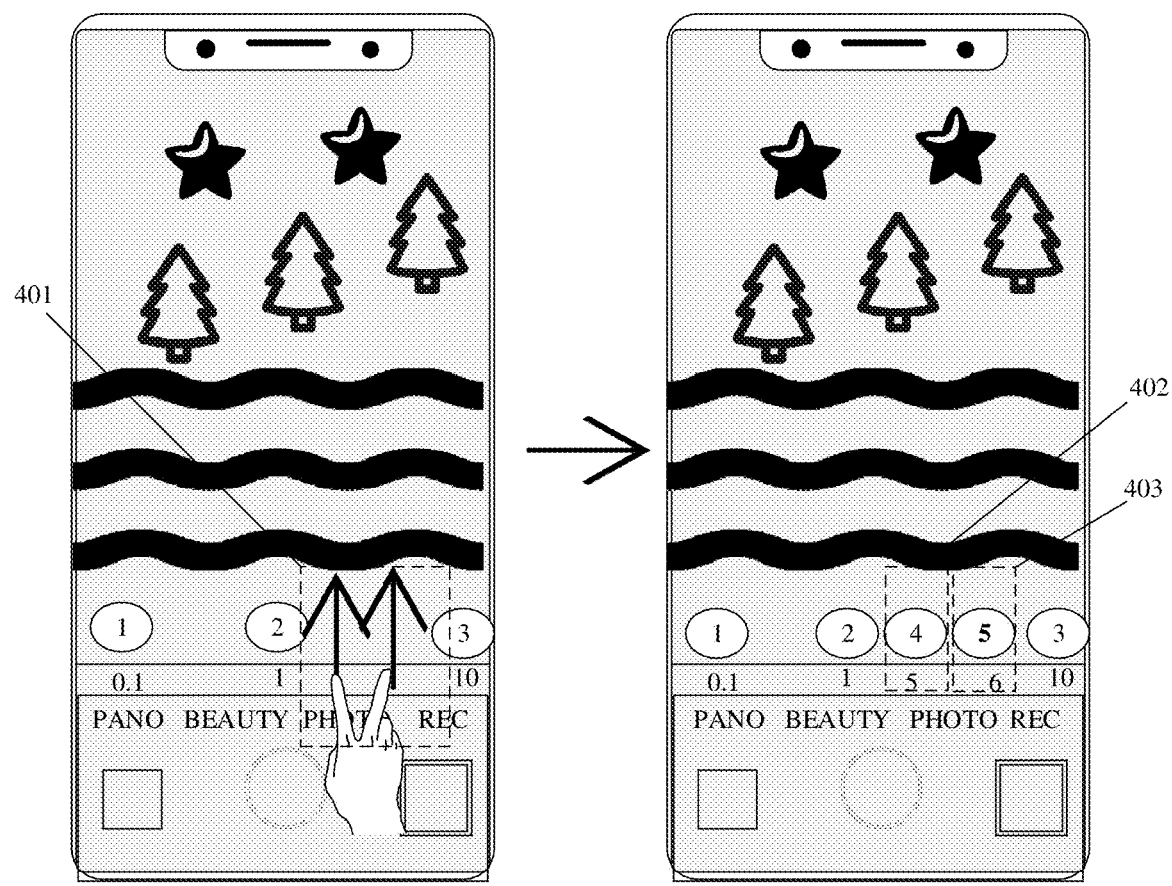
FIG. 4 is a third schematic diagram of a screen for a procedure of setting a target control according to this application.

For example, FIG. 4 is a third schematic diagram of a screen for a procedure of setting a target control according to this application. As shown in FIG. 4, in a case that K=2 and T=3, that is, in a case that three camera icons (which are three camera icons with display numbers 1, 2, and 3) are included in the target control before the first sub-input is received, two camera icons are added simultaneously to the second region, which is specifically as follows:

As shown in the left figure in FIG. 4, in a case that the target control displayed on the current screen is a progress bar, the first sub-input is simultaneously pressing two different target positions of a preset position 401 in the first region by the user with two fingers and then sliding along a direction to the second region for a preset distance. Assuming that depth-of-field values corresponding to the target positions are 5 and 6 in the first region, a camera icon 402 and a camera icon 403 are added at the same time to positions, corresponding to the two target positions, in the second region. Optionally, the new camera icons are numbered through incrementing based on numbers of the original camera icons. To be specific, the two new camera icons have display numbers 4 and 5. Based on the foregoing operations for invoking three cameras of the terminal, cameras (denoted as cameras d and e) associated with the camera icons with the display numbers 4 and 5 are additionally invoked.

Correspondingly, after the camera icon 402 and the camera icon 403 are added simultaneously, the depth-of-field ranges corresponding to the camera icons are as follows:

The camera icon with the display number 1 corresponds to a depth-of-field range of 0.1-1× focal length, the camera icon with the display number 2 corresponds to a depth-of-field range with 1-5× focal length, the camera icon with the display number 4 corresponds to a depth-of-field range with 5-6× focal length, the camera icon with the display number 5 corresponds to a depth-of-field range with 6-10× focal length, and the camera icon with the display number 3 corresponds to a depth-of-field range with focal length greater than 10×.

The first sub-input is performed to set the target control. The second region includes five camera icons with display numbers 1 to 5. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, the camera icon with the display number 5 corresponds to a depth-of-field value of 6, and the camera icon with the display number 3 corresponds to a depth-of-field value of 10. In this case, a photographing depth-of-field range of the camera a corresponding to the camera icon with the display number 1 is a depth-of-field range with 0.1-1× focal length, a photographing depth-of-field range of the camera b corresponding to the camera icon with the display number 2 is a depth-of-field range with 1-5× focal length, a photographing depth-of-field range of the camera d corresponding to the camera icon with the display number 4 is a depth-of-field range with 5-6× focal length, a photographing depth-of-field range of the camera e corresponding to the camera icon with the display number 5 is a depth-of-field range with 6-10× focal length, and a photographing depth-of-field range of the camera c corresponding to the camera icon with the display number 3 is a depth-of-field range with focal length greater than 10×.

Therefore, in the photographing method provided by this application, the user may perform the first sub-input to set the target control, so as to flexibly invoke more cameras on the terminal. In this way, cameras corresponding to different depth-of-field ranges and the number of cameras can be user-defined, or invoking of one or more cameras can be disabled, providing the user with a convenient way to operate a plurality of cameras.

Optionally, the user may alternatively operate a plurality of camera icons in the second region at the same time with a plurality of fingers by using the foregoing operation method.

Optionally, the first sub-input may be pressing the target position in the second region by the user and then sliding along a direction to the first region for a preset distance. In response to the first sub-input, a camera icon is added directly at the target position and a depth-of-field value is correspondingly added to a depth-of-field range, corresponding to the target position, in the first region.

Optionally, the first sub-input may be a touch-and-hold operation performed on a target position in the second region by the user, so as to add one camera icon at the target position in response to the first sub-input.

Optionally, the first sub-input may be a touch-and-hold operation performed on a target position in the first region by the user, so as to add one depth-of-field value at the target position and correspondingly add one camera icon within the second region. Duration of the touch-and-hold operation may be set according to actual requirements, for example, 1 second.

In the photographing method provided in this application, a camera icon is added to the target control to implement the purpose of invoking more cameras on the terminal. During addition of new cameras, setting of a photographing depth-of-field range for the added camera is completed. The user can perform operations on the target control to implement operations of invoking and switching of a plurality of cameras, setting of photographed objects, and disabling, so as to provide the user with a way to quickly perform setting for multi-camera photography. This can effectively improve operation efficiency of the user and reduce an operation time for the user.

Based on content of the foregoing embodiment, as an optional embodiment, the first input includes a second sub-input and a third sub-input, and the target control includes T camera icons before the first input is received. The displaying M camera icons in a second region of the target control in response to the first input may include:

displaying Q candidate camera icons on the camera preview screen in response to the second sub-input;

receiving a third sub-input from the user on Z target camera icons in the Q candidate camera icons; and in response to the third sub-input, adding the Z target camera icons to a target position in the second region, where the target position is determined based on an input position of the second sub-input, the M cameras include the Z cameras and the T cameras, and M=Z−T.

Optionally, the second sub-input may be an input of pressing the target position by the user, and the third sub-input may be a slide input of dragging at least one of the candidate camera icons to the target position by the user.

Specifically, in the photographing method provided by this application, two inputs are performed on the target control to add one camera icon to the second region of the target control, implementing the purpose of adding and invoking one camera on the terminal. The purpose of the second sub-input is to display Q candidate camera icons on the camera preview screen; and the purpose of the third sub-input is to select and add Z of the Q candidate camera icons to the target position in the second region.

Figure 5:
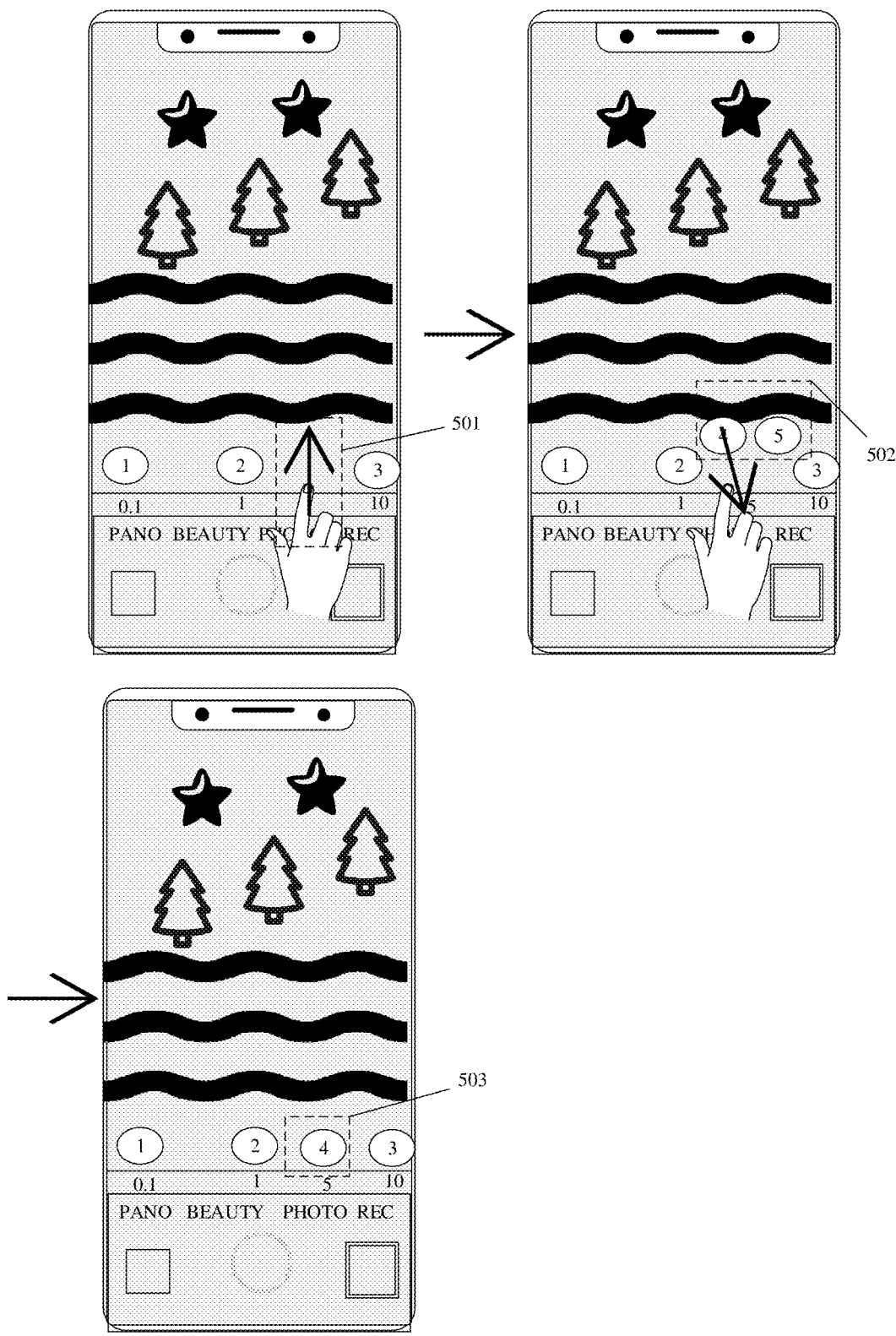
FIG. 5 is a fourth schematic diagram of a screen for a procedure of setting a target control according to this application.

FIG. 5 is a fourth schematic diagram of a screen for a procedure of setting a target control according to this application. As shown in FIG. 5, a method for implementing addition of one camera icon to the target position in the second region in a case of Q=2 and T=1 is provided. Specifically, as shown in the left figure in FIG. 5, before setting for the target control, a total of three cameras (denoted as cameras a, b, and c) of the terminal are invoked, being respectively associated with three camera icons with display numbers 1 to 3 in the second region. The camera icon with the display number 1 corresponds to a depth-of-field value of 0.1, the camera icon with the display number 2 corresponds to a depth-of-field value of 1, and the camera icon with the display number 3 corresponds to a depth-of-field value of 10. To be specific, a photographing depth-of-field range of the camera a corresponding to the camera icon with the display number 1 is a depth-of-field range with 0.1-1× focal length, a photographing depth-of-field range of the camera b corresponding to the camera icon with the display number 2 is a depth-of-field range with 1-10× focal length, and a photographing depth-of-field range of the camera c corresponding to the camera icon with the display number 3 is a depth-of-field range with focal length greater than 10×.

In a case that the target control displayed on the current screen is a progress bar, the second sub-input is pressing a target position 501 in the first region by the user with a finger and then sliding along a direction to the second region for a preset distance, in response to the second input, two camera preview icons are displayed at a position 502 corresponding to the target position 501 in the camera preview screen. As shown in the middle figure in FIG. 5, the display numbers of the two camera preview icons may be sequentially numbered on the basis of the current camera icons in the target control. If three camera icons with display numbers 1, 2, and 3 already exist in the target control, the two camera preview icons may be camera preview icons with display numbers 4 and 5.

Further, the user may perform the third sub-input to select and add one of the two camera preview icons to the target position as a new camera icon.

Optionally, as shown in the right figure in FIG. 5, the third sub-input may be a tap input, for example, the user may tap the camera preview icon with the display number 4 to add it to a region 503.

Optionally, the third sub-input may alternatively be a slide input, for example, the user may press the camera preview icon with the display number 4 with a finger and slide toward the target position to add it to the target position.

In a case that the added camera icon with the display number 4 corresponds to a depth-of-field value of 5, a total of four cameras (denoted as cameras a, b, c, and d) of the terminal are invoked by the terminal, being respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, and the camera icon with the display number 3 corresponds to a depth-of-field value of 10. To be specific, a photographing depth-of-field range of the camera a corresponding to the camera icon with the display number 1 is a depth-of-field range with 0.1-1× focal length, a photographing depth-of-field range of the camera b corresponding to the camera icon with the display number 2 is a depth-of-field range with 1-5× focal length, a photographing depth-of-field range of the camera d corresponding to the camera icon with the display number 4 is a depth-of-field range with 5-10× focal length, and a photographing depth-of-field range of the camera c corresponding to the camera icon with the display number 3 is a depth-of-field range with focal length greater than 10×.

In the photographing method provided by this application, a method for adding a camera is provided. The user may perform selection and then the system recommends an appropriate camera icon based on an input position of the user to quickly complete addition of the camera and setting of a photographing depth-of-field range, thereby effectively reducing an operation time for the user.

Based on content of the foregoing embodiment, as an optional embodiment, the displaying Q candidate camera icons on the camera preview screen in response to the second sub-input includes:
  obtaining a depth-of-field value corresponding to an input position of the second sub-input; and
  displaying the Q candidate camera icons in a case that the depth-of-field value is within a nominal depth-of-field range of cameras corresponding to the Q candidate camera icons.

Specifically, in the photographing method provided by this application, a target position of the second sub-input in the first region is first obtained and then a depth-of-field value of the target position is obtained.

Further, the nominal depth-of-field range of each camera not yet invoked by the terminal is obtained. In a case that the depth-of-field value of the target position falls within a nominal depth-of-field range of a specific camera, one camera icon is associated with the camera, and the camera icon is displayed in the region 502 as one of the Q candidate camera icons. If the depth-of-field value of the target position falls within nominal depth-of-field ranges of a plurality of cameras, one camera icon is associated with each of the plurality of cameras and displayed in the region 502.

For example, in FIG. 5, if a depth-of-field value corresponding to the target position 501 is 5, two candidate camera icons (candidate camera icons with display number 4 and display number 5) are displayed in the region 502 after the user performs the second sub-input. For example, photographing depth-of-field ranges of cameras corresponding to the two candidate camera icons are a depth-of-field range of 4-6× focal length and a depth-of-field range of 3-7× focal length.

Further, in a case that the third sub-input received from the user is a tap input on the candidate camera icon with the display number 4, the candidate camera icon is added to the region 503 in the second region.

Optionally, in a case that the received third sub-input from the user is an operation of dragging the candidate camera icon with the display number 4 by the user to a position a in the second region and dragging the candidate camera icon with the display number 5 to a position b in the second region, the camera icon with the display number 4 is added to the position a in the second region and the camera icon with the display number 5 is added to the position b in the second region. Correspondingly, a depth-of-field value corresponding to the camera icon with the number 4 is a depth-of-field value, corresponding to the position a, in the depth-of-field range in the first region, and a depth-of-field value corresponding to the camera icon with the number 5 is a depth-of-field value, corresponding to the position b, in the depth-of-field range in the first region.

Based on content of the foregoing embodiment, as an optional embodiment, the target control includes M camera icons before the first input is received, the first input includes a fourth sub-input, and the fourth sub-input is an input on a first camera icon and a second camera icon.

The displaying M camera icons in a second region of the target control in response to the first input may include:
  exchanging display positions of the first camera icon and the second camera icon in response to the fourth sub-input.

Optionally, the fourth sub-input is tapping both the first camera icon and the second camera icon by the user.

In the photographing method provided by this application, the user performs an input on any two camera icons, so as to quickly exchange display positions of the two camera icons, and exchange photographing depth-of-field ranges of the cameras corresponding to the two camera icons. This facilitates quick exchange and adjustment of display positions for two related photographed objects by the user during photographing.

Figure 6:
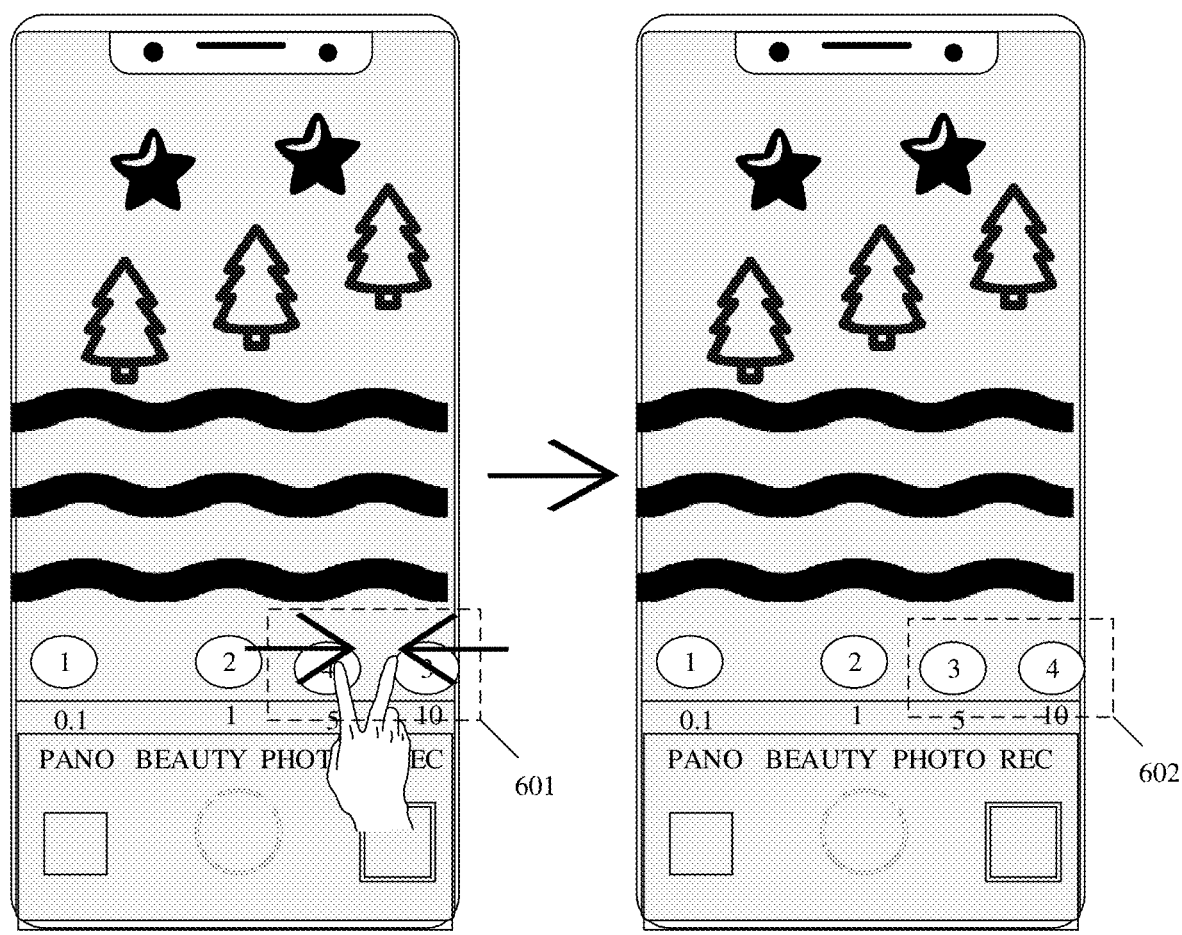
FIG. 6 is a fifth schematic diagram of a screen for a procedure of setting a target control according to this application.

FIG. 6 is a fifth schematic diagram of a screen for a procedure of setting a target control according to this application. As shown in the left figure in FIG. 6, a fourth sub-input is received from the user in a case that the target control on the current screen is a progress bar. The fourth sub-input may be simultaneously tapping both a camera icon with a display number 4 and a camera icon with a display number 3 in a region 601 by the user. As shown in the right figure in FIG. 6, in response to the fourth sub-input, positions of the camera icon with the display number 4 and the camera icon with the display number 3 are exchanged.

Specifically, as shown in the left figure in FIG. 6, before setting for the target control is performed, a total of four cameras (denoted as cameras a, b, c, and d) of the terminal are invoked by the terminal, being respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 4 is a depth-of-field range with 5-10× focal length, and a photographing depth-of-field range of the camera corresponding to the camera icon with the display number 3 is a depth-of-field range with focal length greater than 10×.

After setting for the target control is performed by the fourth sub-input, the four cameras are respectively associated with the four camera icons with the display numbers 1 to 4 in the second region. The camera icon with the display number 1 corresponds to a depth-of-field value of 0.1, the camera icon with the display number 2 corresponds to a depth-of-field value of 1, the camera icon with the display number 3 corresponds to a depth-of-field value of 5, and the camera icon with the display number 4 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 3 is a depth-of-field range with 5-10× focal length, and a photographing depth-of-field range of the camera corresponding to the camera icon with the display number 4 is a depth-of-field range with focal length greater than 10×.

Optionally, in order to prevent user misoperation, the method for setting exchange of the two camera icons may alternatively be: pressing the camera icon with the display number 4 and the camera icon with the display number 3 simultaneously with fingers by the user and holding them for a period of time, so as to exchange positions of the two target camera icons.

Optionally, the method for setting exchange of the two camera icons may alternatively be: pressing the camera icon with the display number 4 and the camera icon with the display number 3 simultaneously with fingers by the user and sliding to a middle position between the two camera icons, so as to exchange positions of the two target camera icons.

Optionally, the foregoing method for setting exchange of the two camera icons may alternatively be: pressing the camera icon with the display number 3 with a finger by the user and moving along a direction to the camera icon with the display number 4 to cross the camera icon with the display number 4 and reach the opposite side of the camera icon with the display number 4, so as to exchange positions of the two target camera icons.

Similarly, the foregoing method for setting exchange of the two camera icons may alternatively be: pressing the camera icon with the display number 4 with a finger by the user and moving along a direction to the camera icon with the display number 3 to cross the camera icon with the display number 3 and reach the opposite side of the camera icon with the display number 3, so as to exchange positions of the two target camera icons.

In the photographing method provided by this application, the user exchanges two camera icons directly in the target control to quickly complete setting of the photographing depth-of-field ranges for the cameras corresponding to the camera icons, effectively reducing the time operation of the user and facilitating the operation.

Based on content of the foregoing embodiment, as an optional embodiment, the target control includes M camera icons before the first input is received, the first input includes a fifth sub-input, and the fifth sub-input is an input on a third camera icon.

The displaying M camera icons in a second region of the target control in response to the first input may include:
updating the third camera icon to a fourth camera icon in response to the fifth sub-input, where the fourth camera icon is determined based on an input characteristic of the first input.

Optionally, the fifth sub-input is performing a rotate input while pressing the camera icon.

In the photographing method provided by this application, an input is received from the user to directly adjust the third camera icon to the fourth camera icon, that is, the photographing depth-of-field range for the camera corresponding to the third camera icon is changed to that for the camera corresponding to the fourth camera icon.

Figure 7:
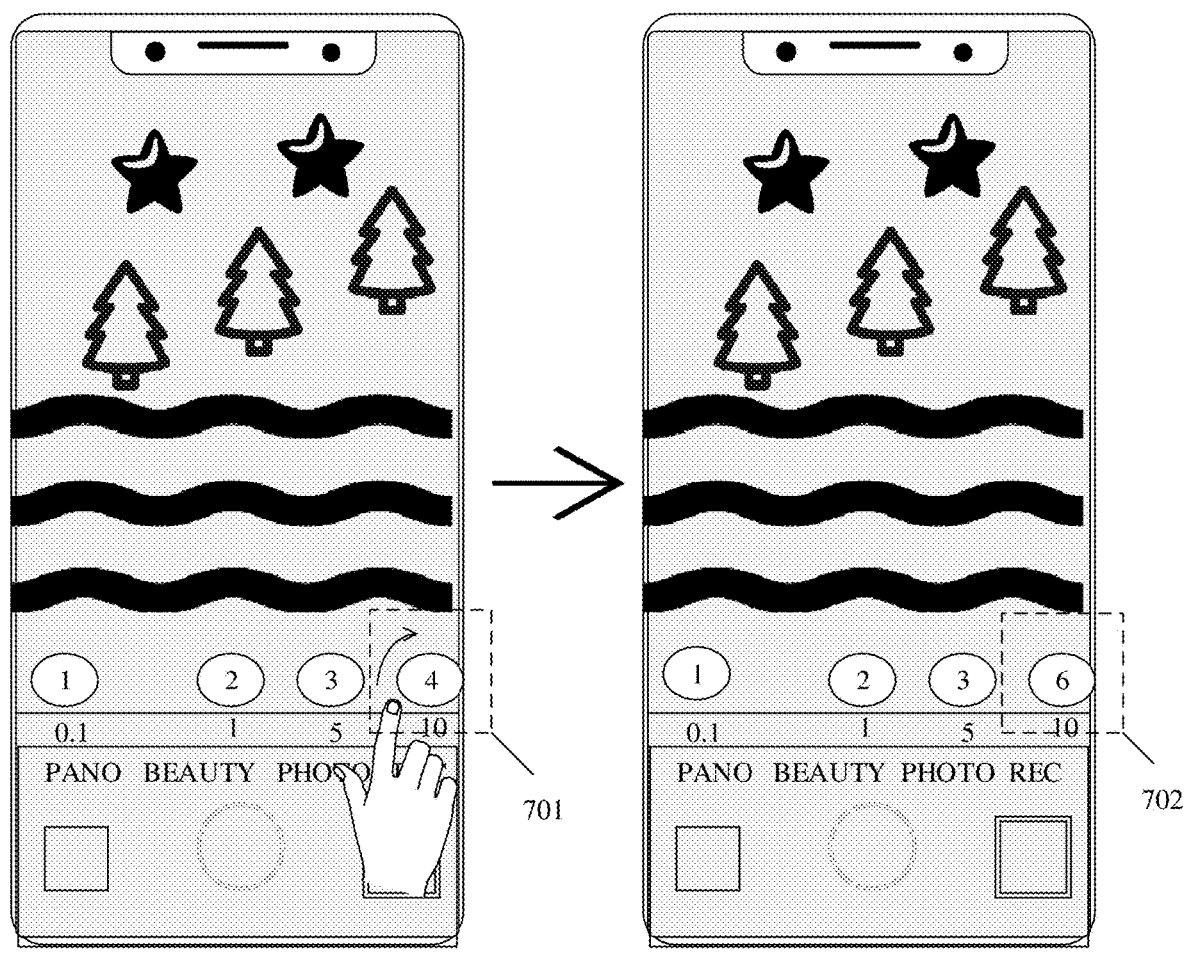
FIG. 7 is a sixth schematic diagram of a screen for a procedure of setting a target control according to this application.

Specifically, FIG. 7 is a sixth schematic diagram of a screen for a procedure of setting a target control according to this application. As shown in the left figure in FIG. 7, in a case that a target control displayed on a current screen is a progress bar and that a camera icon in a region 701 is determined to be a third camera icon, the user presses a camera icon with a display number 4 with a finger and makes rotation, for example, according to a preset direction, clockwise, or counterclockwise, so as to set the camera icon with the display number 4 to another camera icon and display it in the region 701 within the second region.

An input characteristic of the first input may be a characteristic of an input mode, input duration, or input direction of the first input.

Optionally, in a case that the input mode of the first input is an input of pressing the camera icon and making rotation, it may be determined, based on a direction of the rotation input, whether to perform an increase operation or a decrease operation on the display number of the camera icon. For example, it may be set that when the camera icon is pressed and rotated clockwise, the display number of the camera icon is increased accordingly. For example, when being pressed and rotated clockwise, the camera icon of the display number 4 may be replaced with a camera icon 5. Further, for example, in a case that the input mode of the first input is touching and holding the camera icon with one finger by the user, the display number of the camera icon is increased evenly according to an input duration of the first input and the display number flashes at a corresponding position until the end of the first input.

Optionally, in the case that the input mode of the first input is touching and holding the camera icon with one finger by the user while pressing a volume up button with another finger, the display number of the camera icon is increased based on the number of times of pressing the volume up button. If the camera icon with the display number 4 is pressed and the volume up button is pressed twice, the camera icon with the display number 4 may be replaced with a camera icon with 6.

Correspondingly, in the case that the input mode of the first input is touching and holding the camera icon with one finger by the user while pressing a volume down button with another finger, the display number of the camera icon is decreased based on the number of times of pressing the volume down button. If the camera icon with the display number 4 is pressed and the volume down button is pressed twice, the camera icon with the display number 4 may be replaced with a camera icon with 2.

Optionally, if an added camera icon is already present in the second region, a selection menu is displayed to the user so that the user determines a specific setting position of the camera icon according to the selection menu. As in the foregoing embodiment, when being pressed and rotated counterclockwise, if the camera icon with the display number 4 may be replaced with a camera with a display number 3. In a case that the camera with the display number 3 is already present in the second region, a selection menu is displayed on the current display screen to prompt the user to determine a specific position of the camera with the display number 3 after replacement.

Optionally, a magnitude of increase for the camera icon may alternatively be determined based on an angle of the rotate input, for example, for every 15° increase of an angle of rotation, the camera icon is incremented by 1 accordingly. As shown in the right figure in FIG. 7, in a case that the angle of rotation may be between 30° and 45°, the original camera icon with the display number 4 is replaced with a camera icon with a display number 6.

Specifically, as shown in the left figure in FIG. 7, before setting for the target control is performed, a total of four cameras (denoted as cameras a, b, c, and d) of the terminal are invoked by the terminal, being respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 3 corresponds to a depth-of-field value of 5, and the camera icon with the display number 4 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 3 is a depth-of-field range with 5-10× focal length, and a photographing depth-of-field range of the camera corresponding to the camera icon with the display number 4 is a depth-of-field range with focal length greater than 10×.

After setting for the target control is performed by the fifth sub-input, four cameras are respectively associated with four camera icons with display numbers 1, 2, 3, and 6 in the second region. The camera icon with the display number 1 corresponds to a depth-of-field value of 0.1, the camera icon with the display number 2 corresponds to a depth-of-field value of 1, the camera icon with the display number 3 corresponds to a depth-of-field value of 5, and the camera icon with the display number 6 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 3 is a depth-of-field range with 5-10× focal length, and a photographing depth-of-field range of the camera (denoted as camera e) corresponding to the camera icon with the display number 6 is a depth-of-field range with focal length greater than 10×.

It should be noted that, due to change in the number of the camera icon, a camera with a photographing depth-of-field range being a depth-of-field range with focal length greater than 10× is changed from the original camera d to the camera e, and invoking of the camera d is stopped.

In the photographing method provided by this application, the user may change a camera icon in the target control to implement the purpose of changing a camera, and the user may quickly complete camera replacement and configuration of cameras in the depth-of-field range, effectively reducing an operation time of the user and improving efficiency of setting photographing parameters of the camera by the user.

Based on content of the foregoing embodiment, as an optional embodiment, the target control includes M camera icons before the first input is received, and the first input includes a sixth sub-input.

The displaying M camera icons in a second region of the target control in response to the first input may include:
 adjusting, in response to the sixth sub-input, positions of all M camera icons in the second region to be system default positions, where the system default position is determined based on at least one of a current photographing scene characteristic and nominal depth-of-field ranges of M cameras corresponding to the M camera icons.

Optionally, the sixth sub-input of the user may be a slide input in the second region.

In the photographing method provided by this application, the sixth sub-input is received from the user, so as to rearrange, based on a moving track of the sixth sub-input, all camera icons along the track according to system default positions.

Figure 8:
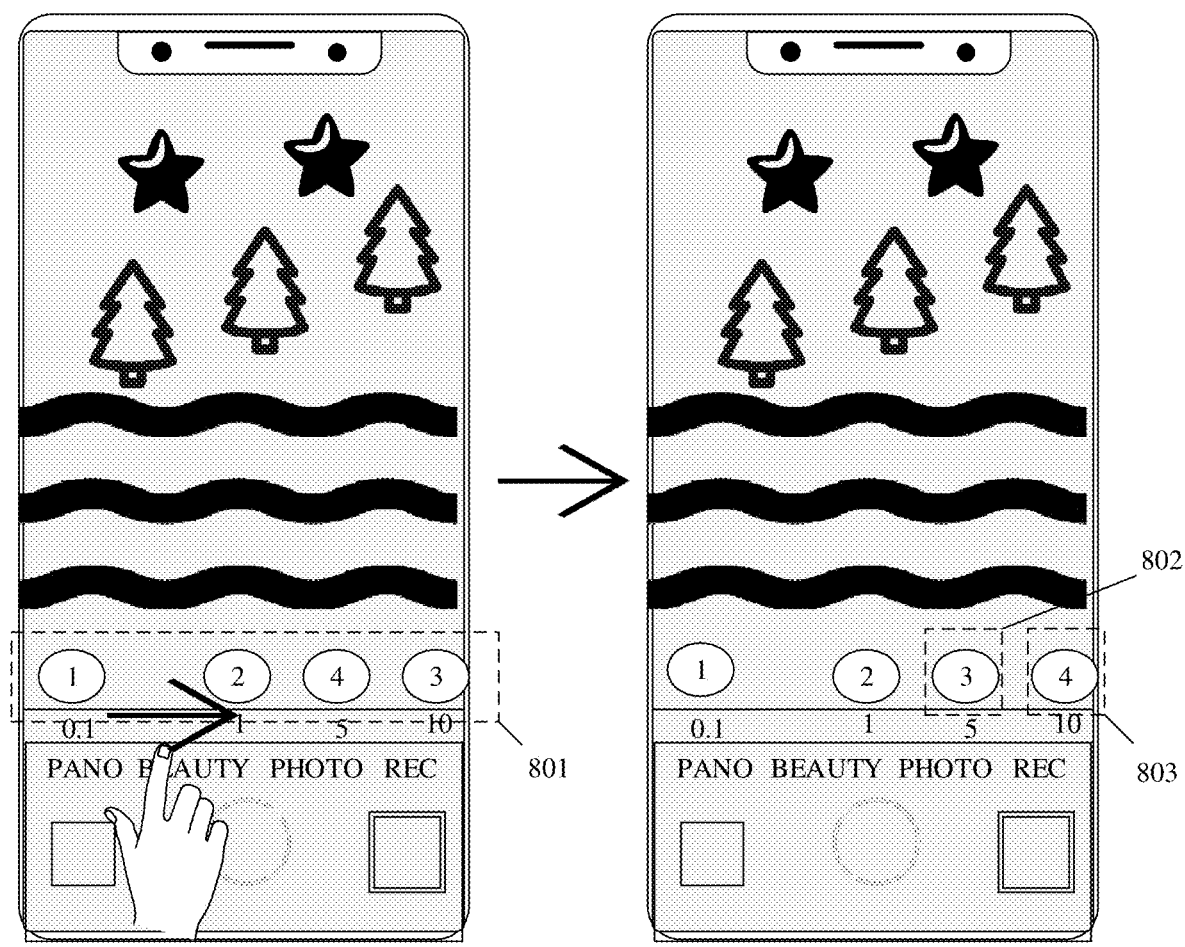
FIG. 8 is a seventh schematic diagram of a screen for a procedure of setting a target control according to this application.

For example, FIG. 8 is a seventh schematic diagram of a screen for a procedure of setting a target control according to this application. As shown in the left figure in FIG. 8, in a case that a target control displayed on a current screen is a progress bar, the sixth sub-input may be an operation of quickly sliding a finger from one side of a region 801 in the second region to the other side in the region of the target control by the user, and the sliding track passes through four camera icons with display numbers 1-4 in sequence. In response to the sixth sub-input, the four camera icons are rearranged according to the system default positions.

The system default position is determined based on a nominal photographing depth-of-field range for a camera corresponding to each camera icon and a current photographing scene characteristic.

The scene characteristic includes a current photographed object, current photographing light, and the like.

For example, in a case that the photographed object is a plurality of objects including a river near, woods slightly far, and starry sky in the distance, a photographing depth-of-field range for the camera icon with the display number 3 is a depth-of-field range with 6-8× focal length, and a photographing depth-of-field range for the camera icon with the display number 4 is a depth-of-field range with 12-14× focal length, after the sixth sub-input is received, camera icons in a region 802 and a region 803 are readjusted. A result of the adjustment is shown in the right figure in FIG. 8.

After the adjustment, the camera icon with the display number 3 is used for photographing in the depth-of-field range corresponding to the woods, and the camera icon with the display number 4 is used for photographing in the depth-of-field range corresponding to the starry sky. In this way, clearer images can be obtained as compared to a photographing mode before the adjustment.

Specifically, as shown in the left figure in FIG. 8, before setting for the target control is performed, a total of four cameras (denoted as cameras a, b, c, and d) of the terminal are invoked by the terminal, being respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 4 is a depth-of-field range with 5-10× focal length, and a photographing depth-of-field range of the camera corresponding to the camera icon with the display number 3 is a depth-of-field range with focal length greater than 10×.

After setting for the target control is performed by the sixth sub-input, four cameras are respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 3 corresponds to a depth-of-field value of 5, and the camera icon with the display number 4 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 3 is a depth-of-field range with 5-10× focal length, and a photographing depth-of-field range of the camera corresponding to the camera icon with the display number 4 is a depth-of-field range with focal length greater than 10×.

It should be noted that in this application, through the sixth sub-input, the photographing depth-of-field ranges corresponding to the original camera c and camera d are exchanged automatically by the terminal based on nominal depth-of-field ranges of the original camera c and camera d and the current photographing scene characteristics, thereby further improving the imaging quality.

Reset content may include not only an arrangement sequence of the camera icons, but also depth-of-field values (that is, spacing between the camera icons) corresponding to the camera icons.

Optionally, the sixth sub-input may be a quick slide from the left side to the right side of the second region or from the right side to the left side of the second region.

Optionally, based on the track of the sixth sub-input, the camera icons through which the track passes are rearranged according to a system default optimal distance, while camera icons through which the tack of the sixth sub-input does not pass are not rearranged.

Optionally, a sliding speed of the sixth sub-input may alternatively be limited in a way that the sixth sub-input can be identified by the terminal only if the sliding speed of the sixth sub-input is greater than a preset sliding speed, so as to rearrange related target camera icons according to the system default positions.

According to the photographing method provided by this application, a method for quickly restoring all started cameras to the system default optimal settings is provided for the user, and the user may quickly complete resetting of all cameras, effectively reducing an operation time of the user and effectively improving the imaging quality.

Based on content of the foregoing embodiment, as an optional embodiment, the target control includes T camera icons before the first input is received, the first input includes a seventh sub-input, and the seventh sub-input is an input on P camera icons on the target control by the user.

The displaying M camera icons in a second region of the target control in response to the first input may include:
deleting the P camera icons in the second region in response to the seventh sub-input, where the T cameras include the P cameras, M=T−P, and P is a positive integer.

The seventh sub-input may be a slide input of dragging the camera icon.

Specifically, according to the photographing method provided by this application, the seventh sub-input is received from the user, so as to delete redundant camera icons to disable invoking of the camera corresponding to the camera icon.

Figure 9:
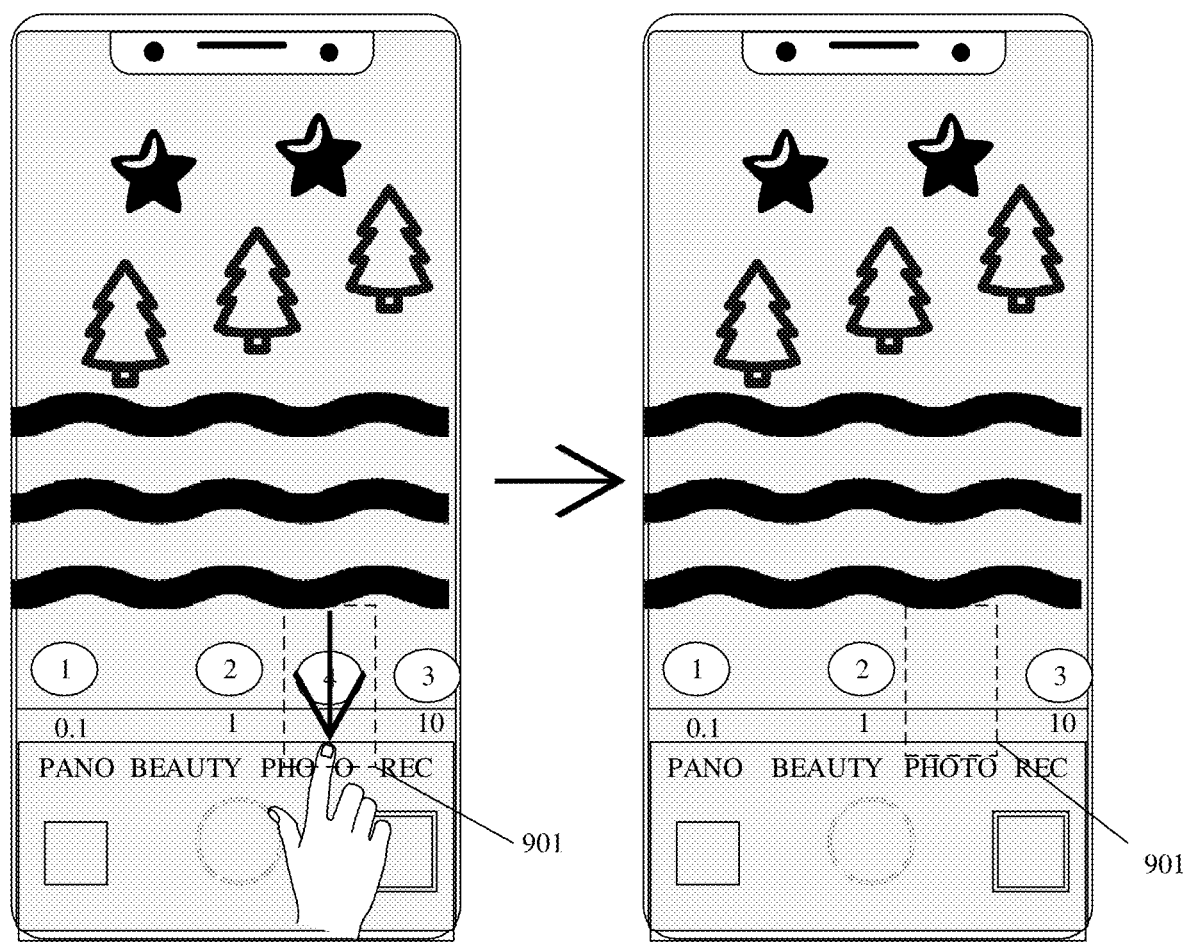
FIG. 9 is an eighth schematic diagram of a screen for a procedure of setting a target control according to this application.

For example, FIG. 9 is an eighth schematic diagram of a screen for a procedure of setting a target control according to this application. As shown in the left figure in FIG. 9, in a case that the target control displayed on the current screen is a progress bar, the seventh sub-input may be an operation of pressing a camera icon with a display number 4 in a region 901 with a finger by the user and sliding down for a preset distance. In response to the seventh sub-input, the camera icon with the display number 4 is deleted. As shown in the right figure in FIG. 9, the original region 901 is blank after the camera icon with the display number 4 is deleted.

Correspondingly, after the camera icon with the display number 4 is deleted, the photographing depth-of-field range of the camera corresponding to the original camera icon with the display number 4 is added into a depth-of-field range of a camera corresponding to a previous camera icon adjacent thereto.

Specifically, the depth-of-field range corresponding to the original camera icon with the display number 4 is a depth-of-field range of 5-10× focal length; and the previous camera icon adjacent thereto is the camera icon with the display number 2, with the corresponding depth-of-field range being a depth-of-field range of 1-5× focal length. After deletion of the camera icon with the display number 4, the depth-of-field range corresponding to the camera icon with the display number 2 is changed to a depth-of-field range of 1-10× focal length accordingly.

Specifically, as shown in the left figure in FIG. 9, before setting for the target control is performed, a total of four cameras (denoted as cameras a, b, c, and d) of the terminal are invoked by the terminal, being respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 4 is a depth-of-field range with 5-10× focal length, and a photographing depth-of-field range of the camera corresponding to the camera icon with the display number 3 is a depth-of-field range with focal length greater than 10×.

After the target control is set using the seventh sub-input, the original camera icon with the display number 4 and a corresponding camera d are deleted, remaining three cameras are associated with three camera icons with display numbers 1, 2, and 3 in the second region, respectively. In this case, the camera icon with the display number 1 corresponds to a depth-of-field value of 0.1, the camera icon with the display number 2 corresponds to a depth-of-field value of 1, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-10× focal length, and a photographing depth-of-field range of the camera corresponding to the camera icon with the display number 3 is a depth-of-field range with focal length greater than 10×.

It should be noted that, for the photographing method provided in this application, the user may alternatively perform input simultaneously with P fingers, and deletes P camera icons by using the foregoing operation method.

Figure 10:
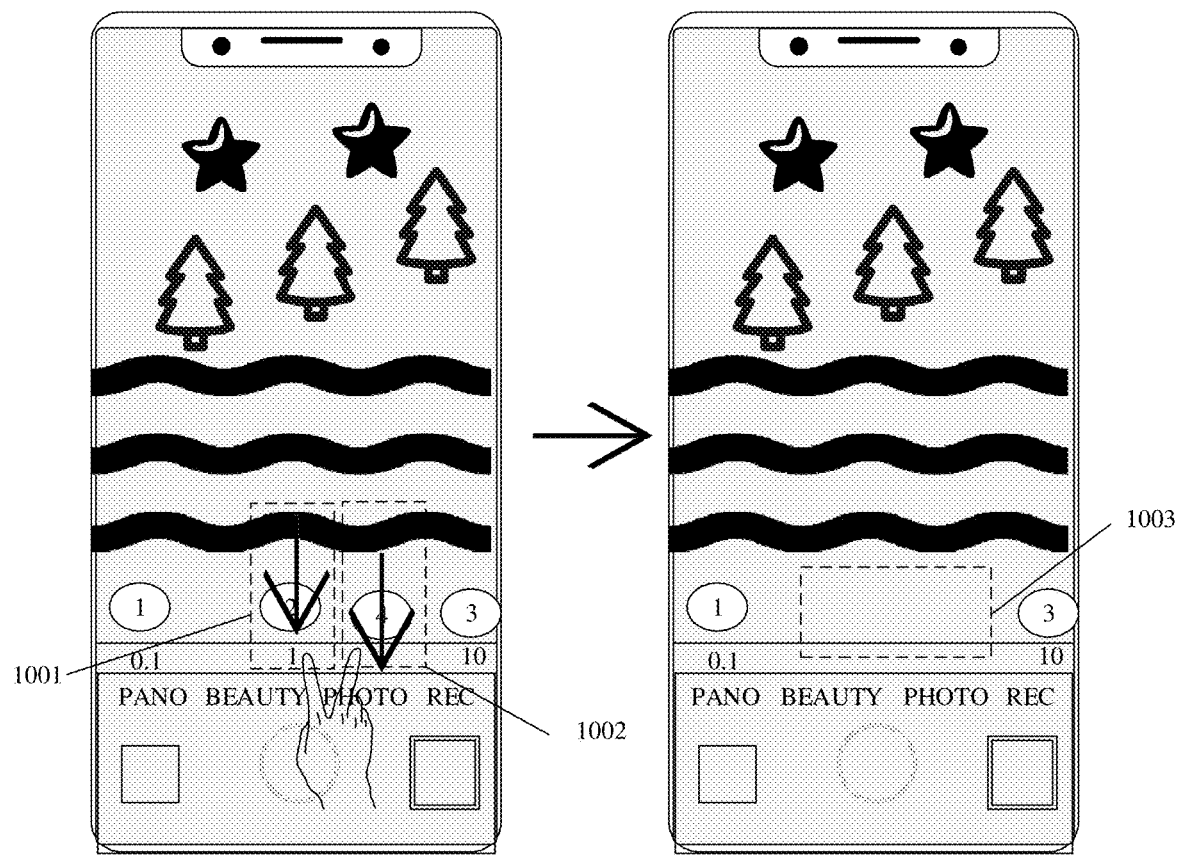
FIG. 10 is a ninth schematic diagram of a screen for a procedure of setting a target control according to this application.

For example, FIG. 10 is a ninth schematic diagram of a screen for a procedure of setting a target control according to this application. As shown in the left figure in FIG. 10, in a case that the target control displayed on the current screen is a progress bar, if the seventh sub-input is an operation of simultaneously pressing a camera icon with a display number 2 in a region 1001 and a camera icon with a display number 4 in a region 1002 with fingers by the user and sliding down simultaneously for a preset distance, the camera icon with the display number 2 and the camera icon with the display number 4 are deleted simultaneously in response to the seventh sub-input. As shown in the right figure in FIG. 10, a region 1003 is blank after the target control is deleted.

Correspondingly, after the camera icon with the display number 2 and the camera icon with the display number 4 are deleted, photographing tasks for photographing ranges of their corresponding cameras are performed by cameras corresponding to previous camera icons adjacent to them.

Specifically, after the camera icon with the display number 2 and the camera icon with the display number 4 are deleted, the photographing ranges of the cameras corresponding to the camera icon with the display number 2 and the camera icon with the display number 4 are added to the corresponding photographing range of the camera corresponding to the camera icon with the display number 1.

Specifically, as shown in the right figure in FIG. 10, after the target control is set using the seventh sub-input, the original camera icons with the display number 2 and display number 4 and corresponding cameras b and d are deleted, remaining two cameras are associated with two camera icons with display numbers 1 and 3 in the second region, respectively. In this case, the camera icon with the display number 1 corresponds to a depth-of-field value of 0.1, and the camera icon with the display number 3 corresponds to a depth-of-field value of 10. To be specific, a photographing depth-of-field range of the camera corresponding to the camera icon with the display number 1 is a depth-of-field range with 0.1-10× focal length, and a photographing depth-of-field range of the camera corresponding to the camera icon with the display number 3 is a depth-of-field range with focal length greater than 10×.

Optionally, this application does not specifically limit a sliding direction of sliding after pressing the camera icon to be deleted is performed. It may be a slide down mode in the foregoing embodiment or may be sliding up or rapid sliding in any other direction (except sliding in the first region).

In the photographing method provided by this application, a method for deleting camera icons in the target control to quickly stop using some cameras is provided, so as to provide the user with a method for quickly performing multi-camera setting. This can effectively reduce an operation time of the user, reduce energy consumption of the terminal to some extent, and adapt to photographing habits of different users.

Based on content of the foregoing embodiment, as an optional embodiment, the first input includes an eighth sub-input, the eighth sub-input is an input from the user on E target camera icons on the target control, the M cameras include E cameras, and E is a positive integer greater than 2.

Before the controlling M cameras to photograph images and outputting a target image, the method may further include:

updating the E target camera icons to a first combined display mode, and updating depth-of-field ranges corresponding to the E cameras to a first target union depth-of-field range, where the first target union depth-of-field range is a union of depth-of-field ranges corresponding to the E cameras, and photographed objects of E target cameras corresponding to the E target camera icons after updating of the depth-of-field range are photographed objects of a same depth-of-field range.

Optionally, the eighth sub-input may be a drag input of simultaneously dragging two camera icons to overlap.

Specifically, in the photographing method provided by this application, a method for setting multi-camera fusion photography is provided. The eighth sub-input is received from the user, the E cameras corresponding to the eighth sub-input are fused into the first combined display mode, and corresponding depth-of-field ranges of the E cameras are combined to serve as the first target union depth-of-field range corresponding to the first combined display mode.

Figure 11:
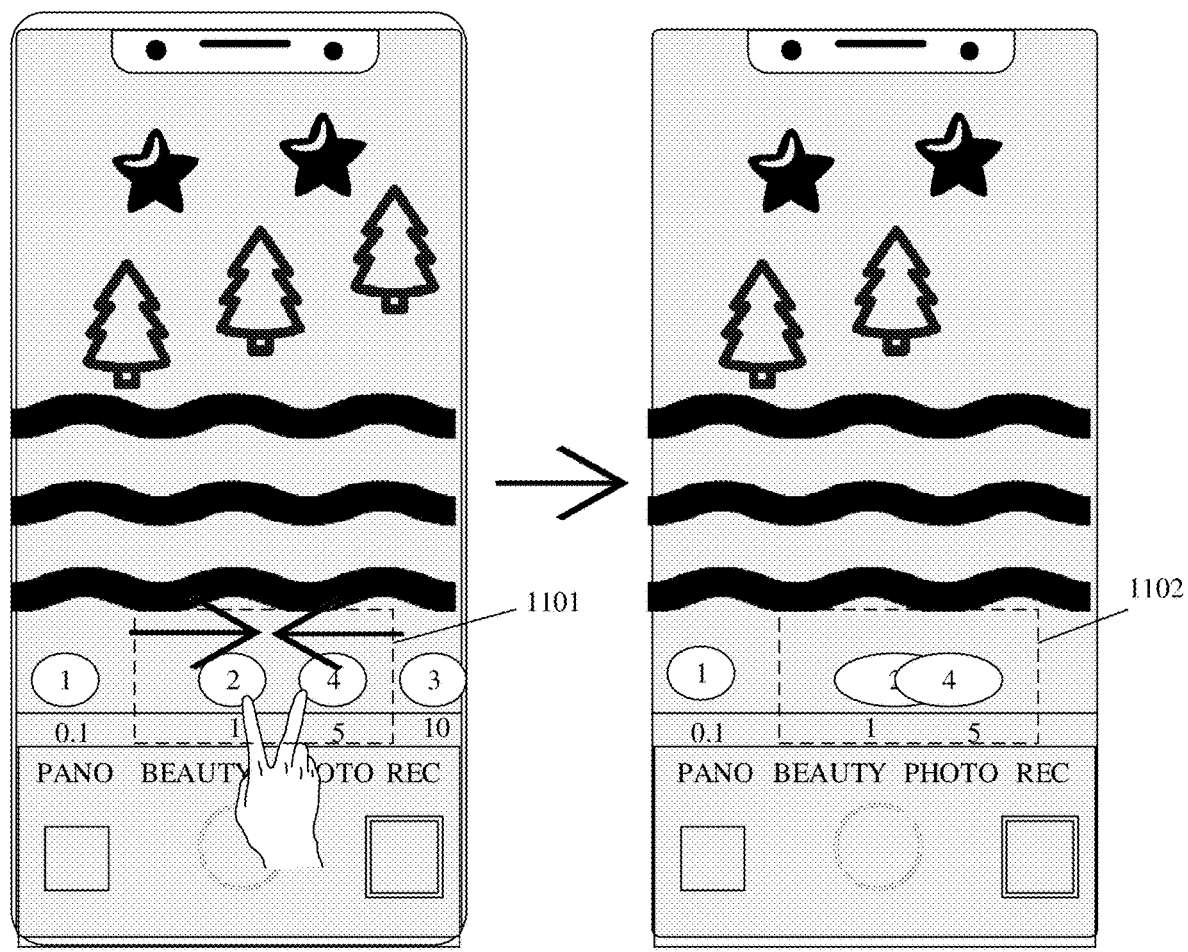
FIG. 11 is a tenth schematic diagram of a screen for a procedure of setting a target control according to this application.

In this embodiment of this application, setting for fusion of two camera icons may be performed. FIG. 11 is a tenth schematic diagram of a screen for a procedure of setting a target control according to this application. As shown in the left figure in FIG. 11, in a case that a target control displayed on a current screen is a progress bar, the user presses a camera icon with a display number 2 and a camera icon with a display number 4 in a region 1101 simultaneously with fingers and drags the two camera icons to overlap. In this case, a first combined display mode including the camera icon with the display number 2 and the camera icon with the display number 4 may be obtained and displayed in a region 1102, as shown in the right figure in FIG. 11.

Further, after fusion of the two camera icons, correspondingly, the depth-of-field range corresponding to the original camera icon 2 (the depth-of-field range of 1-5× focal length) and the depth-of-field range corresponding to the original camera icon 4 (the depth-of-field range of 5-10× focal length) are also combined. To be specific, the first target union depth-of-field range is a depth-of-field range of 1-10× focal length, and photographing is performed in the first target union depth-of-field range in a dual-camera fusion mode by using the cameras corresponding to the camera icon 2 and camera icon 4.

The dual-camera fusion photography means that during specific photographing, the cameras corresponding to the camera icon 2 and camera icon 4 each are for photographing in the depth-of-field range of 1-10× focal length to obtain one frame of image each, and then image fusion is performed on the two frames of image to obtain an output of dual-camera fusion photography.

Specifically, as shown in the left figure in FIG. 11, before setting for the target control is performed, a total of four cameras (denoted as cameras a, b, c, and d) of the terminal are invoked by the terminal, being respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 4 is a depth-of-field range with 5-10× focal length, and a photographing depth-of-field range of the camera corresponding to the camera icon with the display number 3 is a depth-of-field range with focal length greater than 10×.

After the target control is set using the eighth sub-input, the camera icon with the display number 2 is fused with the camera icon with the display number 4 to form the first combined display mode (as shown in the region 1102 in the right figure of FIG. 11). The camera icon with the display number 1 corresponds to a depth-of-field value of 0.1, the first combined display mode corresponds to a depth-of-field value of 1, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the first combined display mode is a depth-of-field range with 1-10× focal length, and a photographing depth-of-field range of the camera corresponding to the camera icon with the display number 3 is a depth-of-field range with focal length greater than 10×.

The first combined display mode may be displayed in a plurality of manners. As shown in the right figure in FIG. 11, after fusion of the camera icon with the display number 2 and the camera icon with the display number 4, the first combined display mode obtained may be a new camera icon by appropriately reducing sizes of the camera icon with the display number 2 and the camera icon with the display number 4 and partially overlapping them.

Optionally, a new camera icon may be generated and numbers 2 and 4 are both displayed on the new camera icon.

This application does not limit a specific display mode of the first combined display mode, and based on a display result, the user is able to know which camera icons are fused in the displayed first combined display mode.

Figure 12:
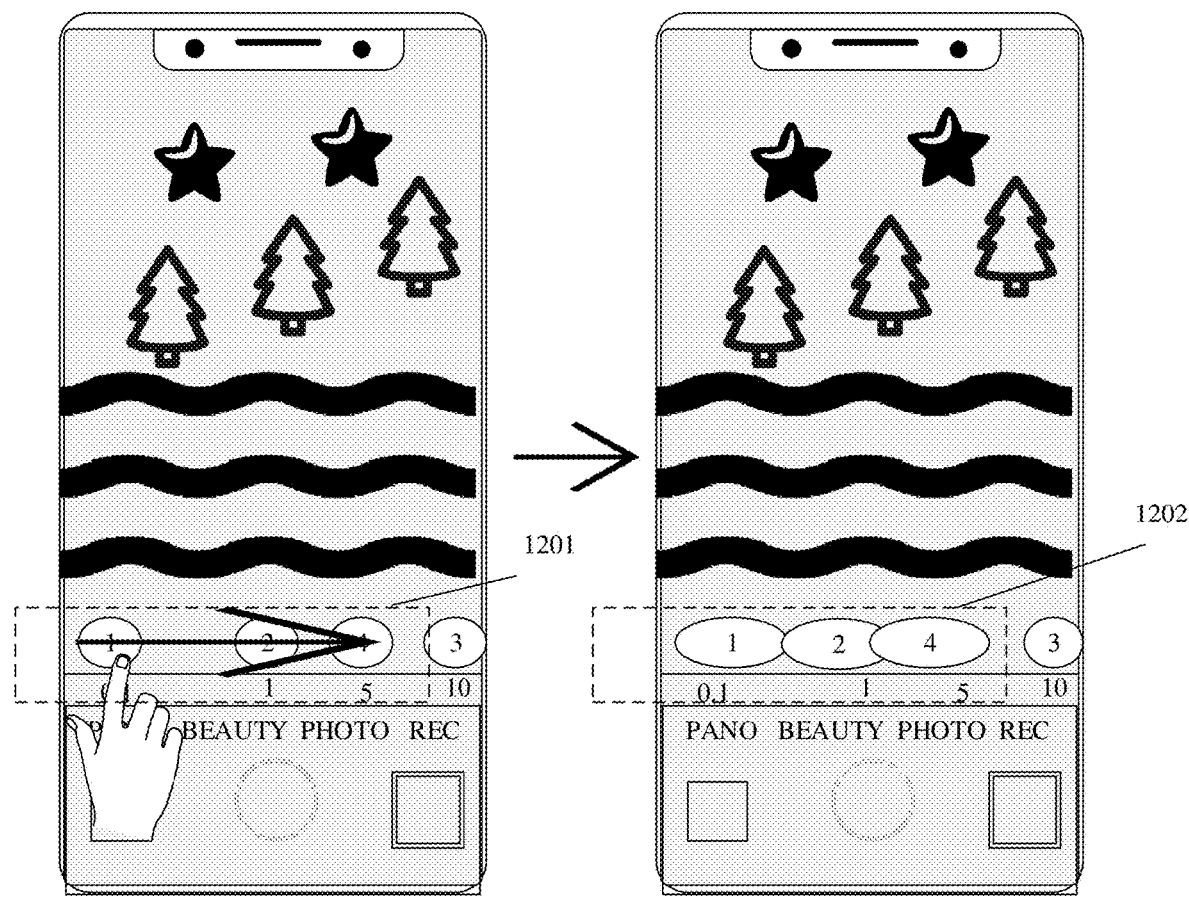
FIG. 12 is an eleventh schematic diagram of a screen for a procedure of setting a target control according to this application.

In this application, setting for fusion of three camera icons may be performed. FIG. 12 is an eleventh schematic diagram of a screen for a procedure of setting a target control according to this application. As shown in FIG. 12, in a case of E=3, that is, an eighth sub-input by the user is for three camera icons, the eighth sub-input by the user is received, and the eighth sub-input is an operation of sliding three camera icons with display numbers 1, 2, and 4 in sequence with a finger by the user in a region 1201. In response to the eighth sub-input, the three camera icons are fused to generate a first combined display mode, and the first combined display mode is displayed in a first target union depth-of-field range corresponding to the original three camera icons. Specifically, the first combined display mode after the fusion is displayed in a region 1202 in the right figure in FIG. 12. The fusion process in this application may be updating display of a fused image in real time during photographing preview.

In the photographing method provided by this application, the user performs a fusion operation on a plurality of camera icons, so as to implement setting for rapid fusion photography of some cameras of the terminal to obtain a fused image of a specific depth-of-field range. This provides a basis for clearer identification of people and background within the depth-of-field range based on a depth information filter, and provides possibility for portrait background blurred photography and after-zoom sharpness adjustment.

Based on content of the foregoing embodiment, as an optional embodiment, the first input includes a ninth sub-input, and the ninth sub-input is an input from the user on two target camera icons on the target control.

Before the controlling M cameras to photograph images and outputting a target image, the method further includes:
  in response to the ninth sub-input, in a track direction of the ninth sub-input, updating the two target camera icons and respective adjacent camera icons to a second combined display mode and a third combined display mode respectively, and updating depth-of-field ranges corresponding to the two target camera icons and the respective adjacent camera icons to a second target union depth-of-field range and a third target union depth-of-field range respectively, where the second target union depth-of-field range and the third target union depth-of-field range each are a union of depth-of-field ranges corresponding to the target camera icon and the adjacent camera icons; where the two target camera icons are non-adjacent camera icons; and
  photographed objects of two target cameras corresponding to a target camera icon and an adjacent camera icon after updating of the depth-of-field range may be photographed objects in a same depth-of-field range.

According to the photographing method provided by this application, a method for setting quick two-two fusion of a plurality of cameras is provided:
  receiving a ninth sub-input from the user, where the ninth sub-input may be a slide input from the user on a plurality of target camera icons in the second region, for example, drawing an arc from a first target camera icon to another target camera icon. In response to the ninth sub-input, two-two fusion on the plurality of camera icons are performed based on camera icons corresponding to start and end ends of the ninth sub-input and a sliding direction of the arc.

Correspondingly, after fusion of two target camera icons, one combined display mode is obtained. A depth-of-field range corresponding to the combined display mode is a union range of the two target camera icons being combined.

Figure 13:
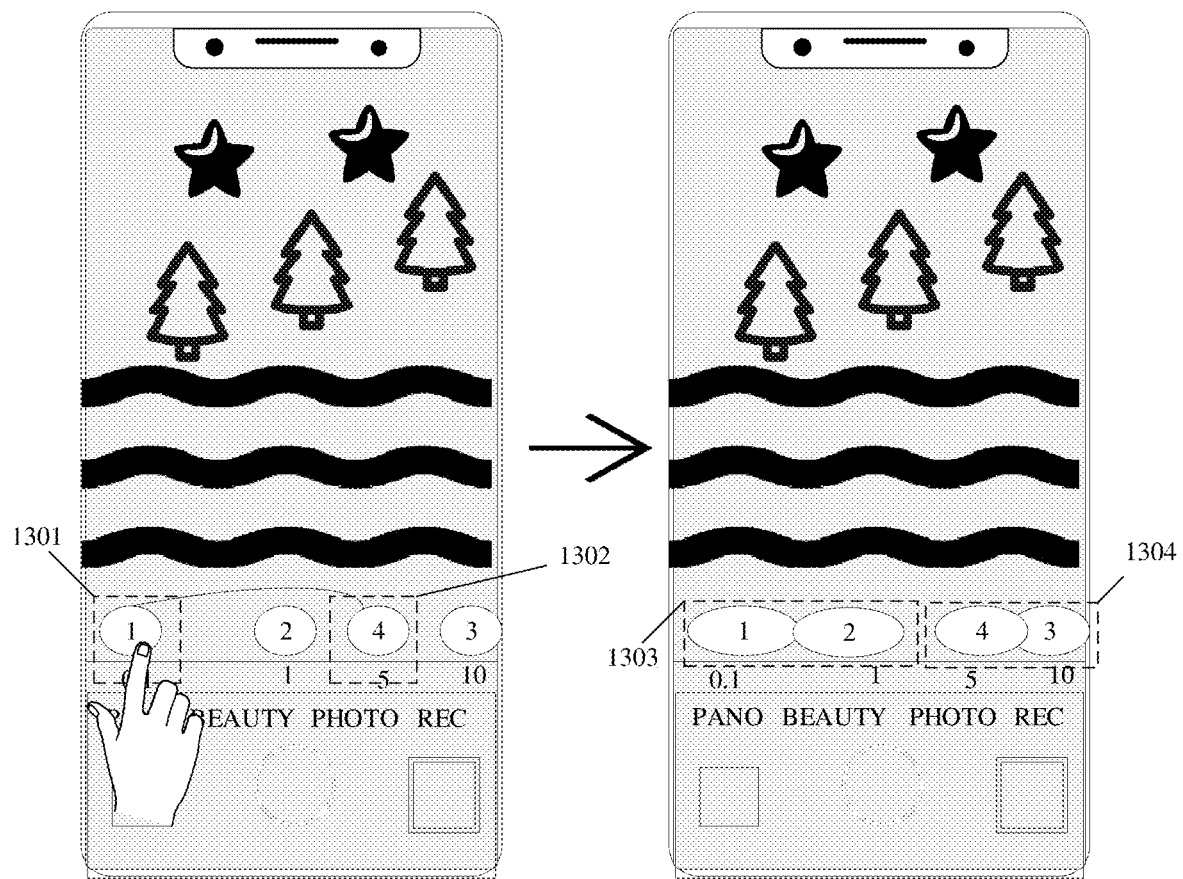
FIG. 13 is a twelfth schematic diagram of a screen for a procedure of setting a target control according to this application.

For example, FIG. 13 is a twelfth schematic diagram of a screen for a procedure of setting a target control according to this application. As shown in the left figure in FIG. 13, a ninth sub-input of the user may be: sliding from a camera icon with a display number 1 in a region 1301 in the second region to a camera icon with a display number 4 in a region 1302. The sliding track of the ninth sub-input is a directed arc connecting the camera icon with the display number 1 to the camera icon with the display number 4. In the arc direction, the camera icon with the display number 1 is adjacent to a camera icon with a display number 2; and the camera icon with the display number 4 is adjacent to a camera icon with a display number 3.

In response to the ninth sub-input, the camera icon with the display number 1 and the camera icon 2 are fused into one fused camera icon; and the camera icon with the display number 4 and the camera icon 3 are fused into another fused camera icon. A schematic diagram of an obtained target control after fusion is shown in the right figure in FIG. 13, that is, a second combined display mode is displayed in a region 1303 and a third combined display mode is displayed in a region 1304.

Before fusion, the depth-of-field ranges corresponding to the camera icons are as follows: the camera icon with the display number 1 corresponds to a depth-of-field range with 0.1-1× focal length, the camera icon with the display number 2 corresponds to a depth-of-field range with 1-5× focal length, the camera icon with the display number 4 corresponds to a depth-of-field range with 5-10× focal length, and the camera icon with the display number 3 corresponds to a depth-of-field range with focal length greater than 10×. After the fusion, a second target union depth-of-field range corresponding to the second combined display mode is a union depth-of-field range of depth-of-field ranges of the original camera icon with the display number 1 and camera icon with the display number 2, specifically, being a depth-of-field range of 0.1-5× focal length; and a third target union depth-of-field range corresponding to the third combined display mode is a union depth-of-field range of depth-of-field ranges of the original camera icon with the display number 4 and camera icon with the display number 3, specifically, being a depth-of-field range of focal length greater than 5×.

Specifically, as shown in the left figure in FIG. 13, before setting for the target control is performed, a total of four cameras (denoted as cameras a, b, c, and d) of the terminal are invoked by the terminal, being respectively associated with four camera icons with display numbers 1 to 4 in the second region. The camera icon with the display number 1 corresponds to a depth-of-field value of 0.1, the camera icon with the display number 2 corresponds to a depth-of-field value of 1, the camera icon with the display number 4 corresponds to a depth-of-field value of 5, and the camera icon with the display number 3 corresponds to a depth-of-field value of 10. To be specific, a photographing depth-of-field range of the camera corresponding to the camera icon with the display number 1 is a depth-of-field range with 0.1-1× focal length, a photographing depth-of-field range of the camera corresponding to the camera icon with the display number 2 is a depth-of-field range with 1-5× focal length, a photographing depth-of-field range of the camera corresponding to the camera icon with the display number 4 is a depth-of-field range with 5-10× focal length, and a photographing depth-of-field range of the camera corresponding to the camera icon with the display number 3 is a depth-of-field range with focal length greater than 10×.

After the target control is set using the ninth sub-input, the camera icon with the display number 1 is fused with the camera icon with the display number 2 to obtain the second combined display mode (as shown in the region 1301), and the camera icon with the display number 4 is fused with the camera icon with the display number 3 to obtain the third combined display mode (as shown in the region 1304). The depth-of-field value corresponding to the second combined display mode is 0.1 and the depth-of-field value corresponding to the third combined display mode is 5. To be specific, cameras a and b corresponding to the second combined display mode perform fusion photographing together in the depth-of-field range of 0.1-5× focal length, and cameras 4 and 3 corresponding to the third combined display mode perform fusion photographing together in the depth-of-field range with focal length greater than 5×.

This application provides a method for grouping a plurality of cameras for fusion. The target control is provided on the camera preview screen, so that the user makes setting for the target control to implement quick and accurate setting for switching of a plurality of cameras. In this way, clear images with different depths of field correspondingly photographed by different cameras are composited to output the target image, and all objects in the obtained target image have clear images. This effectively improves convenience of performing multi-camera photographing operation by the user and effectively improves the imaging quality.

Figure 14:
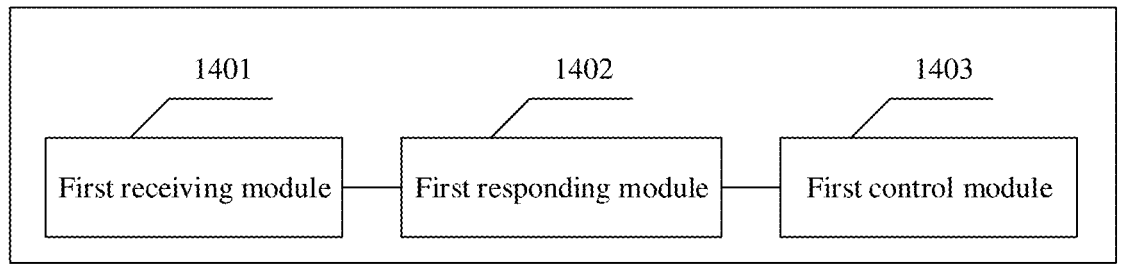
FIG. 14 is a schematic structural diagram of a photographing apparatus according to this application.

FIG. 14 is a schematic structural diagram of a photographing apparatus according to this application. As shown in FIG. 14, this application provides a photographing apparatus, including, but not limited to, a first receiving module 1401, a first responding module 1402, and a first control module 1403.

The first receiving module 1401 is configured to receive a first input from a user on a target control in a camera preview screen, where the target control includes a first region, the first region corresponds to N depth-of-field values, and N is a positive integer greater than 1.

The first responding module 1402 is mainly configured to display M camera icons in a second region of the target control in response to the first input, where M is a positive integer greater than 1, each camera icon corresponds to one depth-of-field range, and each depth-of-field range is determined based on a depth-of-field value corresponding to a target position of each camera icon in the second region.

The first control module 1403 is mainly configured to control M cameras to photograph images, and output a target image, where the target image is obtained by compositing the images photographed by the M cameras, and the M cameras are cameras associated with the M camera icons.

Specifically, the first receiving module 1401 may receive an input of tapping a camera icon on the camera preview screen by the user. At the beginning of entering the camera preview screen, one target control is directly displayed on the camera preview screen, and the target control is a multi-camera operation screen.

Further, the first receiving module 1401 is further configured to receive an operation or input on the target control by the user and preset operating parameters of the cameras and switching between the cameras of the terminal.

For example, the first input may alternatively be an operation of pressing two fingers on a terminal display at a preset position by the user and simultaneously sliding to two sides of the screen for a distance.

It should be noted that for the photographing apparatus provided in this application, the target control mainly includes a first region and a second region. The first region corresponds to a plurality of depth-of-field value identifiers, each depth-of-field value identifier corresponds to one depth-of-field value, and depth-of-field values divide a photographing depth-of-field range into a plurality of consecutive depth-of-field ranges. A plurality of camera icons is provided in a second region corresponding to each depth-of-field value in the first region.

Further, after the first receiving module 1401 receives the first input from the user on the target control, the first responding module 1402 identifies the first input in response to the first input, so as to implement an operation on the camera icons and corresponding depth-of-field ranges on the target control, and display an operation result.

Because the camera icons correspond to different cameras on the terminal, the operations such as switching and setting for each camera corresponding to the camera icon can be implemented by performing the operation on the camera icon.

Further, after obtaining related setting parameters of the after-adjustment target control, the first control module 1403 controls each of the M cameras corresponding to the M depth-of-field ranges to photograph a scene within the range to obtain one frame of image. Finally, the obtained M frames are fused into the target image for outputting.

According to the photographing apparatus provided by this application, the target control is provided on the camera preview screen, so that the user makes setting for the target control to implement quick and accurate setting for switching of a plurality of cameras. In this way, clear images with different depths of field correspondingly photographed by different cameras are composited to output the target image, and all objects in the obtained target image have clear images. This effectively improves convenience of performing multi-camera photographing operation by the user and effectively improves the imaging quality.

Optionally, in the photographing apparatus provided in this application, the first control module is specifically configured to control each of the cameras associated with the M camera icons to photograph one frame of depth-of-field image, so as to obtain M frames of depth-of-field images; and composite the M frames of depth-of-field images to output the target image.

Optionally, for the photographing apparatus provided in this application, the first input includes a first sub-input, and the first sub-input is an input from the user on K target positions of the target control. T camera icons are included on the target control before the first sub-input is received.

The first responding module may be specifically configured to:

in response to the first sub-input, add K camera icons to K target positions in the second region; and update depth-of-field ranges corresponding to the K camera icons and T camera icons based on the K target positions; where a start depth-of-field value of the i-th depth-of-field range corresponding to the i-th camera icon in the updated K camera icons is a depth-of-field value corresponding to a target position at which the i-th camera icon is located; in a case that the i-th camera icon has adjacent camera icons on both sides, an end depth-of-field value of the i-th depth-of-field range is a depth-of-field value corresponding to a target position in which the (i+1)-th camera icon in a depth-of-field value increasing direction is located; and in a case that the i-th camera icon has no adjacent camera icon in the depth-of-field value increasing direction, the end depth-of-field value of the i-th depth-of-field range is infinite; where the i-th camera icon is any one of the K camera icons, the M cameras include the K cameras and the T cameras, and M=K+T.

Optionally, for the photographing apparatus provided in this application, the first input includes a second sub-input and a third sub-input, and the first responding module includes a first response unit, a second response unit, and a third response unit.

The first response unit is configured to display Q candidate camera icons on the camera preview screen in response to the second sub-input.

The second response unit is configured to receive a third sub-input from the user on Z target camera icons in the Q candidate camera icons.

The third response unit is configured to: in response to the third sub-input, add the Z target camera icons to a target position in the second region, where the target position is determined based on an input position of the second sub-input, the M cameras include the Z cameras and the T cameras, and M=Z+T.

Optionally, for the photographing apparatus provided in this application, the first response unit of the first responding module is specifically configured to:

obtain a depth-of-field value corresponding to an input position of the second sub-input; and display the Q candidate camera icons in a case that the depth-of-field value is within a nominal depth-of-field range of cameras corresponding to the Q candidate camera icons.

Optionally, for the photographing apparatus provided in this application, the target control includes M camera icons before the first input is received, the first input includes a fourth sub-input, and the fourth sub-input is an input on a first camera icon and a second camera icon.

The first responding module may be specifically configured to:

exchange display positions of the first camera icon and second camera icon in response to the fourth sub-input.

Optionally, for the photographing apparatus provided in this application, the target control includes M camera icons before the first input is received, the first input includes a fifth sub-input, and the fifth sub-input is an input on a third camera icon.

The first responding module may be specifically configured to:

update the third camera icon to a fourth camera icon in response to the fifth sub-input, where the fourth camera icon is determined based on an input characteristic of the first input.

Optionally, for the photographing apparatus provided in this application, the target control includes M camera icons before the first input is received, and the first input includes a sixth sub-input.

The first responding module may be specifically configured to:

adjust, in response to the sixth sub-input, positions of all M camera icons in the second region to be system default positions, where the system default position is determined based on at least one of a current photographing scene characteristic and nominal depth-of-field ranges of M cameras corresponding to the M camera icons.

Optionally, for the photographing apparatus provided in this application, the target control includes M camera icons before the first input is received, the first input includes a seventh sub-input, and the seventh sub-input is an input from the user on P camera icons of the target control.

The first responding module may be specifically configured to:

delete the P camera icons in the second region in response to the seventh sub-input, where the T cameras include the P cameras, M=T−P, and P is a positive integer.

Optionally, for the photographing apparatus provided in this application, the first input includes an eighth sub-input, the eighth sub-input is an input from the user on E target camera icons on the target control, the M cameras include E cameras, and E is a positive integer greater than 2.

The first control module may be further configured to:

before the M cameras are controlled to photograph images and output the target image, update the E target camera icons to a first combined display mode, and update depth-of-field ranges corresponding to the E cameras to a first target union depth-of-field range, where the first target union depth-of-field range is a union of depth-of-field ranges corresponding to the E cameras, and photographed objects of E target cameras corresponding to the E target camera icons after updating of the depth-of-field range are photographed objects of a same depth-of-field range.

Optionally, for the photographing apparatus provided in this application, the first input includes a ninth sub-input, and the ninth sub-input is an input from the user on two target camera icons on the target control. The first control module may be further configured to:

before the M cameras are controlled to photograph images and output the target image, in response to the ninth sub-input, in a track direction of the ninth sub-input, update the two target camera icons and respective adjacent camera icons to a second combined display mode and a third combined display mode respectively, and update depth-of-field ranges corresponding to the two target camera icons and the respective adjacent camera icons to a second target union depth-of-field range and a third target union depth-of-field range respectively, where the second target union depth-of-field range and the third target union depth-of-field range each are a union of depth-of-field ranges corresponding to the target camera icon and the adjacent camera icons; where the two target camera icons are non-adjacent camera icons; and photographed objects of two target cameras corresponding to a target camera icon and an adjacent camera icon after updating of the depth-of-field range are photographed objects in a same depth-of-field range.

The photographing apparatus provided in this application is capable of implementing all the method steps of the foregoing method embodiment, with the same technical effects achieved, and details are not repeated herein.

The terminal in this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in this application.

The photographing apparatus in this application may be an apparatus with an operating system. The operating system may be an Android operating system, an iOS operating system, or other possible operating systems, and is not specifically limited in this application.

The photographing apparatus provided in this application is capable of implementing the processes implemented by the photographing apparatus in the method embodiments in FIG. 1 to FIG. 13. To avoid repetition, details are not described herein again.

Figure 15:
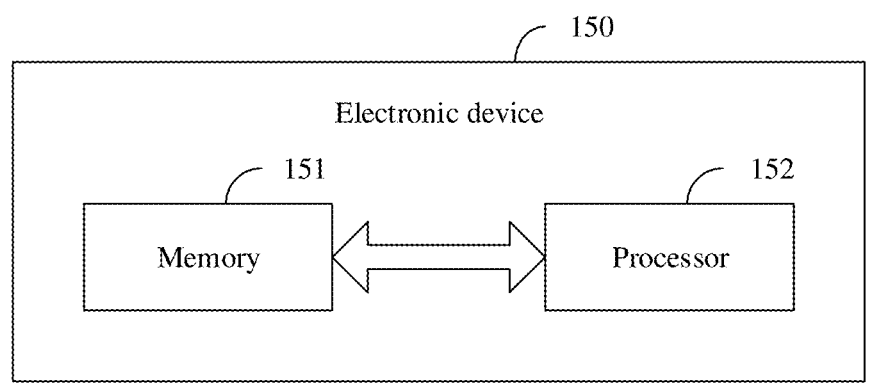
FIG. 15 is a first schematic structural diagram of an electronic device according to this application.

Optionally, this application further provides an electronic device 150, as shown in FIG. 15, including a processor 152, a memory 151, and a program or instructions stored in the memory 151 and capable of running on the processor 152. When the program or the instructions are executed by the processor 152, the processes of the foregoing embodiments of the photographing method are implemented, with the same technical effects achieved. To avoid repetition, details are not described herein again.

It should be noted that the electronic device in this application includes the aforementioned mobile electronic device and non-mobile electronic device.

Figure 16:
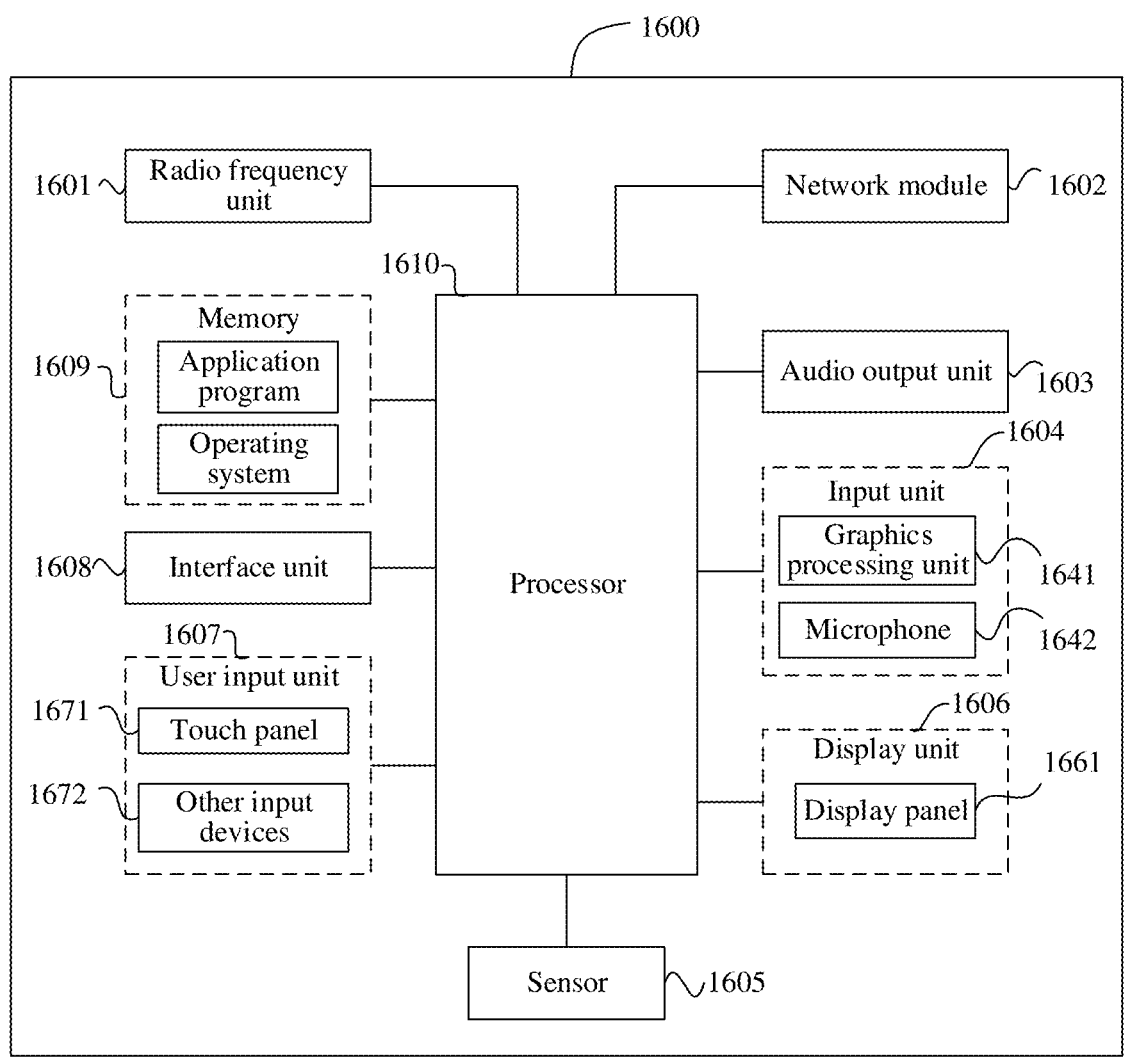
FIG. 16 is a second schematic structural diagram of an electronic device according to this application.

FIG. 16 is a schematic diagram of a hardware structure of an electronic device for implementing this application.

The electronic device 1600 includes but is not limited to components such as a radio frequency unit 1601, a network module 1602, an audio output unit 1603, an input unit 1604, a sensor 1605, a display unit 1606, a user input unit 1607, an interface unit 1608, a memory 1609, and a processor 1610.

A person skilled in the art can understand that the electronic device 1600 may further include a power supply (for example, a battery) supplying power to all components, and the power supply may be logically connected to the processor 1610 through a power management system. In this way, functions such as charge management, discharge management, and power consumption management are implemented by using the power management system. The structure of the electronic device shown in FIG. 16 does not constitute any limitation on the electronic device. The electronic device may include more or fewer components than those shown in the figure, or a combination of some components, or the components disposed differently. Details are not repeated herein.

It may be understood that in this application, the input unit 1604 may include a graphics processing unit (GPU) 1641 and a microphone 1642. The graphics processing unit 1641 processes image data of a still picture or video obtained by an image capture apparatus (such as a camera) in a video capture mode or an image capture mode. The display unit 1606 may include a display panel 1661, and the display panel 1661 may be configured in a form of a liquid crystal display, an organic light-emitting diode, and the like. The user input unit 1607 may include a touch panel 1671 and other input devices 1672. The touch panel 1671 is also referred to as a touchscreen. The touch panel 1671 may include two parts: a touch detection apparatus and a touch controller. The other input devices 1672 may include but are not limited to a physical keyboard, a function key (such as a volume control button or a power on/off button), a trackball, a mouse, a joystick, and the like. Details are not described herein. The memory 1609 may be configured to store software programs and various data, including but not limited to application programs and an operating system. The processor 1610 may integrate an application processor and a modem processor, where the application processor mainly processes the operating system, user interfaces, application programs, and the like, and the modem processor mainly processes wireless communication. It can be understood that the modem processor may alternatively be not integrated in the processor 1610.

The processor 1610 is configured to: receive a first input from a user on a target control in a camera preview screen, where the target control includes a first region, the first region corresponds to N depth-of-field values, and N is a positive integer greater than 1; display M camera icons in a second region of the target control in response to the first input, where M is a positive integer greater than 1, each camera icon corresponds to one depth-of-field range, and each depth-of-field range is determined based on a depth-of-field value corresponding to a target position of each camera icon in the second region; and control M cameras to photograph images, and output a target image, where the target image is obtained by compositing the images photographed by the M cameras, and the M cameras are cameras associated with the M camera icons.

Optionally, the processor 1610 is specifically configured to: control each of the cameras associated with the M camera icons to photograph one frame of depth-of-field image, so as to obtain M frames of depth-of-field images; and
    composite the M frames of depth-of-field images to output the target image.

Optionally, the first input includes a first sub-input, and the first sub-input is an input from the user on K target positions of the target control. T camera icons are included on the target control before the first sub-input is received.
    The processor 1610 is specifically configured to:
    in response to the first sub-input, add K camera icons to K target positions in the second region; and
    update depth-of-field ranges corresponding to the K camera icons and T camera icons based on the K target positions; where a start depth-of-field value of the i-th depth-of-field range corresponding to the i-th camera icon in the updated K camera icons is a depth-of-field value corresponding to a target position at which the i-th camera icon is located; in a case that the i-th camera icon has adjacent camera icons on both sides, an end depth-of-field value of the i-th depth-of-field range is a depth-of-field value corresponding to a target position in which the (i+1)-th camera icon in a depth-of-field value increasing direction is located; and in a case that the i-th camera icon has no adjacent camera icon in the depth-of-field value increasing direction, the end depth-of-field value of the i-th depth-of-field range is infinite; where the i-th camera icon is any one of the K camera icons, the M cameras include the K cameras and the T cameras, and M=K+T.

Optionally, the first input includes a second sub-input and a third sub-input, and the target control includes T camera icons before the first input is received.

The processor 1610 may include a first response unit, a second response unit, and a third response unit.

The first response unit is configured to display Q candidate camera icons on the camera preview screen in response to the second sub-input.

The second response unit is configured to receive a third sub-input from the user on Z target camera icons in the Q candidate camera icons.

The third response unit is configured to: in response to the third sub-input, add the Z target camera icons to a target position in the second region, where the target position is determined based on an input position of the second sub-input, the M cameras include the Z cameras and the T cameras, and M=Z+T.

Optionally, the first response unit of the processor 1610 is specifically configured to:
    obtain a depth-of-field value corresponding to an input position of the second sub-input; and
    display the Q candidate camera icons in a case that the depth-of-field value is within a nominal depth-of-field range of cameras corresponding to the Q candidate camera icons.

Optionally, the target control includes M camera icons before the first input is received, the first input includes a fourth sub-input, and the fourth sub-input is an input on a first camera icon and a second camera icon.
    The processor 1610 may be specifically configured to:
    exchange display positions of the first camera icon and second camera icon in response to the fourth sub-input.

Optionally, the target control includes M camera icons before the first input is received, the first input includes a fifth sub-input, and the fifth sub-input is an input on a third camera icon.
    The processor 1610 may be specifically configured to:
    update the third camera icon to a fourth camera icon in response to the fifth sub-input, where the fourth camera icon is determined based on an input characteristic of the first input.

Optionally, the target control includes M camera icons before the first input is received, and the first input includes a sixth sub-input.
    The processor 1610 may be specifically configured to:
    adjust, in response to the sixth sub-input, positions of all M camera icons in the second region to be system default positions, where the system default position is determined based on at least one of a current photographing scene characteristic and nominal depth-of-field ranges of M cameras corresponding to the M camera icons.

Optionally, the target control includes T camera icons before the first input is received, the first input includes a seventh sub-input, and the seventh sub-input is an input from the user on P camera icons of the target control.
    The processor 1610 may be specifically configured to:
    delete the P camera icons in the second region in response to the seventh sub-input, where the T cameras include the P cameras, M=T−P, and P is a positive integer.

Optionally, the first input includes an eighth sub-input, the eighth sub-input is an input from the user on E target camera icons on the target control, the M cameras include E cameras, and E is a positive integer greater than 2.

The first control module of the processor 1610 may be further configured to:
    before the M cameras are controlled to photograph images and output the target image, update the E target camera icons to a first combined display mode, and update depth-of-field ranges corresponding to the E cameras to a first target union depth-of-field range, where the first target union depth-of-field range is a union of depth-of-field ranges corresponding to the E cameras, and photographed objects of E target cameras corresponding to the E target camera icons after updating of the depth-of-field range are photographed objects of a same depth-of-field range.

Optionally, the first input includes a ninth sub-input, and the ninth sub-input is an input from the user on two target camera icons on the target control.

The first control module of the processor 1610 is further configured to:

before the M cameras are controlled to photograph images and output the target image, in response to the ninth sub-input, in a track direction of the ninth sub-input, update the two target camera icons and respective adjacent camera icons to a second combined display mode and a third combined display mode respectively, and update depth-of-field ranges corresponding to the two target camera icons and the respective adjacent camera icons to a second target union depth-of-field range and a third target union depth-of-field range respectively, where the second target union depth-of-field range and the third target union depth-of-field range each are a union of depth-of-field ranges corresponding to the target camera icon and the adjacent camera icons; where the two target camera icons are non-adjacent camera icons, and photographed objects of two target cameras corresponding to a target camera icon and an adjacent camera icon after updating of the depth-of-field range are photographed objects in a same depth-of-field range.

According to the electronic device provided by this application, the target control is provided on the camera preview screen, so that the user makes setting for the target control to implement quick and accurate setting for switching of a plurality of cameras. In this way, clear images with different depths of field correspondingly photographed by different cameras are composited to output the target image. This effectively improves convenience of performing multi-camera photographing operation by the user and effectively improves the imaging quality.

This application further provides a readable storage medium, where a program or an instruction is stored in the readable storage medium. When the program or instruction is executed by a processor, the processes of the foregoing photographing method embodiment can be implemented, with same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc. The computer-readable storage medium includes, for example, a non-transitory computer-readable storage medium, such as a read-only memory (ROM), a random access memory (RAM), a magnetic disk, or an optical disc.

This application further provides a chip, where the chip includes a processor and a communications interface, the communications interface is coupled to the processor, and the processor is configured to run a program or instructions to implement the foregoing photographing method embodiments, with the same technical effects achieved. To avoid repetition, details are not repeated herein.

An embodiment of this application further provides an electronic device, configured to perform the processes of the foregoing photographing method embodiment, with the same technical effects achieved. To avoid repetition, details are not described herein.

An embodiment of this application provides a computer program product, and the computer program product is executed by at least one processor to perform the processes of the foregoing photographing method embodiment, with the same technical effects achieved. To avoid repetition, details are not described herein.

It should be understood that the chip mentioned in this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A photographing method, comprising:
   receiving a first input from a user on a target control in a camera preview screen, wherein the target control comprises a first region, the first region corresponds to N depth-of-field values, and N is a positive integer greater than 1;
   displaying M camera icons in a second region of the target control in response to the first input, wherein M is a positive integer greater than 1, each camera icon corresponds to one depth-of-field range, and each depth-of-field range is determined based on a depth-of-field value corresponding to a target position of each camera icon in the second region; and controlling M cameras to photograph images and outputting a target image, wherein the target image is obtained by compositing the images photographed by the M cameras, and the M cameras are cameras associated with the M camera icons;

wherein the target control comprises M camera icons before the first input is received, the first input comprises a fifth sub-input, and the fifth sub-input is an input on a third camera icon; and the displaying M camera icons in a second region of the target control in response to the first input comprises:

updating the third camera icon to a fourth camera icon in response to the fifth sub-input, wherein the fourth camera icon is determined based on an input characteristic of the first input.

2. The photographing method according to claim 1, wherein the controlling M cameras to photograph images and outputting a target image comprises:

controlling each of the cameras associated with the M camera icons to photograph one frame of depth-of-field image, so as to obtain M frames of depth-of-field images; and compositing the M frames of depth-of-field images to output the target image.

3. The photographing method according to claim 1, wherein the first input comprises a first sub-input, the first sub-input is an input from the user on K target positions of the target control, and T camera icons are comprised on the target control before the first sub-input is received; and the displaying M camera icons in a second region of the target control in response to the first input comprises:

in response to the first sub-input, adding K camera icons to K target positions in the second region; and updating depth-of-field ranges corresponding to the K camera icons and T camera icons based on the K target positions; wherein a start depth-of-field value of the i-th depth-of-field range corresponding to the i-th camera icon in the updated K camera icons is a depth-of-field value corresponding to a target position at which the i-th camera icon is located; in a case that the i-th camera icon has adjacent camera icons on both sides, an end depth-of-field value of the i-th depth-of-field range is a depth-of-field value corresponding to a target position in which the (i+1)-th camera icon in a depth-of-field value increasing direction is located; and in a case that the i-th camera icon has no adjacent camera icon in the depth-of-field value increasing direction, the end depth-of-field value of the i-th depth-of-field range is infinite; wherein the i-th camera icon is any one of the K camera icons, the M cameras comprise the K cameras and the T cameras, and M=K+T.

4. The photographing method according to claim 1, wherein the first input comprises a second sub-input and a third sub-input, the target control comprises T camera icons before the first input is received, and the displaying M camera icons in a second region of the target control in response to the first input comprises:

displaying Q candidate camera icons on the camera preview screen in response to the second sub-input;

receiving a third sub-input from the user on Z target camera icons in the Q candidate camera icons; and in response to the third sub-input, adding the Z target camera icons to a target position in the second region, wherein the target position is determined based on an input position of the second sub-input, the M cameras comprise the Z cameras and the T cameras, and M=Z+T.

5. The photographing method according to claim 4, wherein the displaying Q candidate camera icons on the camera preview screen in response to the second sub-input comprises:

obtaining a depth-of-field value corresponding to an input position of the second sub-input; and displaying the Q candidate camera icons in a case that the depth-of-field value is within a nominal depth-of-field range of cameras corresponding to the Q candidate camera icons.

6. The photographing method according to claim 1, wherein the target control comprises M camera icons before the first input is received, the first input comprises a fourth sub-input, and the fourth sub-input is an input on a first camera icon and a second camera icon; and the displaying M camera icons in a second region of the target control in response to the first input comprises:

exchanging display positions of the first camera icon and second camera icon in response to the fourth sub-input.

7. The photographing method according to claim 1, wherein the target control comprises M camera icons before the first input is received, and the first input comprises a sixth sub-input; and the displaying M camera icons in a second region of the target control in response to the first input comprises:

adjusting, in response to the sixth sub-input, positions of all M camera icons in the second region to be system default positions, wherein the system default position is determined based on at least one of a current photographing scene characteristic and nominal depth-of-field ranges of M cameras corresponding to the M camera icons.

8. The photographing method according to claim 1, wherein the target control comprises T camera icons before the first input is received, the first input comprises a seventh sub-input, and the seventh sub-input is an input from the user on P camera icons of the target control; and the displaying M camera icons in a second region of the target control in response to the first input comprises:

deleting the P camera icons in the second region in response to the seventh sub-input, wherein the T cameras comprise the P cameras, M=T−P, and P is a positive integer.

9. The photographing method according to claim 1, wherein the first input comprises an eighth sub-input, the eighth sub-input is an input from the user on E target camera icons on the target control, the M cameras comprise E cameras, and E is a positive integer greater than 2; and before the controlling M cameras to photograph images and outputting a target image, the method further comprises:

updating the E target camera icons to a first combined display mode, and updating depth-of-field ranges corresponding to the E cameras to a first target union depth-of-field range, wherein the first target union depth-of-field range is a union of depth-of-field ranges corresponding to the E cameras, and photographed objects of E target cameras corresponding to the E target camera icons after updating of the depth-of-field range are photographed objects of a same depth-of-field range.

10. The photographing method according to claim 1, wherein the first input comprises a ninth sub-input, and the ninth sub-input is an input from the user on two target camera icons on the target control; and before the controlling M cameras to photograph images and outputting a target image, the method further comprises:

in response to the ninth sub-input, in a track direction of the ninth sub-input, updating the two target camera icons and respective adjacent camera icons to a second combined display mode and a third combined display mode respectively, and updating depth-of-field ranges corresponding to the two target camera icons and the respective adjacent camera icons to a second target union depth-of-field range and a third target union depth-of-field range respectively, wherein the second target union depth-of-field range and the third target union depth-of-field range each are a union of depth-of-field ranges corresponding to the target camera icon and the adjacent camera icons; wherein the two target camera icons are non-adjacent camera icons, and photographed objects of two target cameras corresponding to a target camera icon and an adjacent camera icon after updating of the depth-of-field range are photographed objects in a same depth-of-field range.

11. An electronic device, comprising a processor, a memory, and a program or instructions stored in the memory and capable of running on the processor, wherein when the program or the instructions are executed by the processor, implementing:

receiving a first input from a user on a target control in a camera preview screen, wherein the target control comprises a first region, the first region corresponds to N depth-of-field values, and N is a positive integer greater than 1;

displaying M camera icons in a second region of the target control in response to the first input, wherein M is a positive integer greater than 1, each camera icon corresponds to one depth-of-field range, and each depth-of-field range is determined based on a depth-of-field value corresponding to a target position of each camera icon in the second region; and controlling M cameras to photograph images and outputting a target image, wherein the target image is obtained by compositing the images photographed by the M cameras, and the M cameras are cameras associated with the M camera icons;

wherein the target control comprises M camera icons before the first input is received, the first input comprises a fifth sub-input, and the fifth sub-input is an input on a third camera icon; and the displaying M camera icons in a second region of the target control in response to the first input comprises:

updating the third camera icon to a fourth camera icon in response to the fifth sub-input, wherein the fourth camera icon is determined based on an input characteristic of the first input.

12. The electronic device according to claim 11, wherein the controlling M cameras to photograph images and outputting a target image comprises:

controlling each of the cameras associated with the M camera icons to photograph one frame of depth-of-field image, so as to obtain M frames of depth-of-field images; and compositing the M frames of depth-of-field images to output the target image.

13. The electronic device according to claim 11, wherein the first input comprises a first sub-input, the first sub-input is an input from the user on K target positions of the target control, and T camera icons are comprised on the target control before the first sub-input is received; and the displaying M camera icons in a second region of the target control in response to the first input comprises:

in response to the first sub-input, adding K camera icons to K target positions in the second region; and updating depth-of-field ranges corresponding to the K camera icons and T camera icons based on the K target positions; wherein a start depth-of-field value of the i-th depth-of-field range corresponding to the i-th camera icon in the updated K camera icons is a depth-of-field value corresponding to a target position at which the i-th camera icon is located; in a case that the i-th camera icon has adjacent camera icons on both sides, an end depth-of-field value of the i-th depth-of-field range is a depth-of-field value corresponding to a target position in which the (i+1)-th camera icon in a depth-of-field value increasing direction is located; and in a case that the i-th camera icon has no adjacent camera icon in the depth-of-field value increasing direction, the end depth-of-field value of the i-th depth-of-field range is infinite; wherein the i-th camera icon is any one of the K camera icons, the M cameras comprise the K cameras and the T cameras, and M=K+T.

14. The electronic device according to claim 11, wherein the first input comprises a second sub-input and a third sub-input, the target control comprises T camera icons before the first input is received, and the displaying M camera icons in a second region of the target control in response to the first input comprises:

displaying Q candidate camera icons on the camera preview screen in response to the second sub-input;

receiving a third sub-input from the user on Z target camera icons in the Q candidate camera icons; and in response to the third sub-input, adding the Z target camera icons to a target position in the second region, wherein the target position is determined based on an input position of the second sub-input, the M cameras comprise the Z cameras and the T cameras, and M=Z+T.

15. The electronic device according to claim 14, wherein the displaying Q candidate camera icons on the camera preview screen in response to the second sub-input comprises:

obtaining a depth-of-field value corresponding to an input position of the second sub-input; and displaying the Q candidate camera icons in a case that the depth-of-field value is within a nominal depth-of-field range of cameras corresponding to the Q candidate camera icons.

16. The electronic device according to claim 11, wherein the target control comprises M camera icons before the first input is received, the first input comprises a fourth sub-input, and the fourth sub-input is an input on a first camera icon and a second camera icon; and the displaying M camera icons in a second region of the target control in response to the first input comprises:

exchanging display positions of the first camera icon and second camera icon in response to the fourth sub-input.

17. The electronic device according to claim 11, wherein the target control comprises M camera icons before the first input is received, and the first input comprises a sixth sub-input; and the displaying M camera icons in a second region of the target control in response to the first input comprises:
adjusting, in response to the sixth sub-input, positions of all M camera icons in the second region to be system default positions, wherein the system default position is determined based on at least one of a current photographing scene characteristic and nominal depth-of-field ranges of M cameras corresponding to the M camera icons.

18. A non-transient readable storage medium, wherein the readable storage medium stores a program or an instruction, and when the program or the instruction is executed by a processor, implementing:
receiving a first input from a user on a target control in a camera preview screen, wherein the target control comprises a first region, the first region corresponds to N depth-of-field values, and N is a positive integer greater than 1;
displaying M camera icons in a second region of the target control in response to the first input, wherein M is a positive integer greater than 1, each camera icon corresponds to one depth-of-field range, and each depth-of-field range is determined based on a depth-of-field value corresponding to a target position of each camera icon in the second region; and
controlling M cameras to photograph images and outputting a target image, wherein the target image is obtained by compositing the images photographed by the M cameras, and the M cameras are cameras associated with the M camera icons;
wherein the target control comprises M camera icons before the first input is received, the first input comprises a fifth sub-input, and the fifth sub-input is an input on a third camera icon; and
the displaying M camera icons in a second region of the target control in response to the first input comprises:
updating the third camera icon to a fourth camera icon in response to the fifth sub-input, wherein the fourth camera icon is determined based on an input characteristic of the first input.

* * * * *